United States Patent
Finateu et al.

(10) Patent No.: US 11,368,645 B2
(45) Date of Patent: Jun. 21, 2022

(54) IMAGE SENSOR WITH A PLURALITY OF SUPER-PIXELS

(71) Applicant: Prophesee SA, Paris (FR)

(72) Inventors: Thomas Finateu, Veneux les Sablons (FR); Daniel Matolin, Freital (DE); Christoph Posch, Bad Fischau-Brunn (AT)

(73) Assignee: PROPHESEE SA, Paris (FR)

(*) Notice: Subject to any disclaimer, the term of this patent is extended or adjusted under 35 U.S.C. 154(b) by 0 days.

(21) Appl. No.: 17/255,972

(22) PCT Filed: Jun. 27, 2019

(86) PCT No.: PCT/EP2019/067264
§ 371 (c)(1),
(2) Date: Dec. 23, 2020

(87) PCT Pub. No.: WO2020/002562
PCT Pub. Date: Jan. 2, 2020

(65) Prior Publication Data
US 2021/0127083 A1    Apr. 29, 2021

Related U.S. Application Data

(60) Provisional application No. 62/780,913, filed on Dec. 17, 2018, provisional application No. 62/690,948, filed on Jun. 27, 2018.

(51) Int. Cl.
*H04N 5/3745* (2011.01)
*H04N 5/378* (2011.01)
(Continued)

(52) U.S. Cl.
CPC ....... *H04N 5/37455* (2013.01); *H04N 5/3454* (2013.01); *H04N 5/3559* (2013.01);
(Continued)

(58) Field of Classification Search
CPC ......... H04N 5/23241; H04N 5/232411; H04N 5/345–3456; H04N 5/3698; H04N 5/37455; G01S 17/89–90
See application file for complete search history.

(56) References Cited

U.S. PATENT DOCUMENTS

| 7,728,269 B2 | 6/2010 | Lichtsteiner et al. |
| 8,780,240 B2 | 7/2014 | Posch et al. |

(Continued)

FOREIGN PATENT DOCUMENTS

| EP | 1 862 820 A2 | 12/2007 |
| EP | 3313064 A1 | 4/2018 |

(Continued)

OTHER PUBLICATIONS

International Search Report dated Feb. 1, 2020 for PCT/EP2019/067264, filed on Jun. 27, 2019 (5 pages).
(Continued)

*Primary Examiner* — Paul M Berardesca
(74) *Attorney, Agent, or Firm* — Finnegan, Henderson, Farabow, Garrett & Dunner LLP

(57) ABSTRACT

The present disclosure generally relates to image sensors and methods for image sensing. More specifically, and without limitation, this disclosure relates to systems and methods for providing super-pixels, and implementing and using image sensors with super-pixels. In one implementation, an image sensor includes a plurality of super-pixels. Each super-pixel may include a first photosensitive element; a detector electrically connected to the first photosensitive element and configured to generate a trigger signal when an analog signal proportional to brightness of light impinging on the first photosensitive element matches a condition; a second photosensitive element; an exposure measurement circuit electrically connected to the second photosensitive element and configured to convert an analog signal proportional to brightness of light impinging on the second photosensitive element to a digital signal; and a logic circuit electrically connected to the detector and the exposure measurement circuit and configured to enable the exposure measurement circuit in response to the trigger signal and to (Continued)

disable the exposure measurement circuit when the digital signal is read out from the exposure measurement circuit.

28 Claims, 29 Drawing Sheets

(51) Int. Cl.
*H04N 5/369* (2011.01)
*H04N 5/345* (2011.01)
*H04N 5/355* (2011.01)
*H04N 9/04* (2006.01)

(52) U.S. Cl.
CPC ....... *H04N 5/35554* (2013.01); *H04N 5/3698* (2013.01); *H04N 5/378* (2013.01); *H04N 5/379* (2018.08); *H04N 5/37452* (2013.01); *H04N 5/37457* (2013.01); *H04N 9/04555* (2018.08); *H04N 9/04559* (2018.08)

(56) References Cited

U.S. PATENT DOCUMENTS

| | | |
|---|---|---|
| 9,631,974 B2 | 4/2017 | Delbruck et al. |
| 9,967,479 B2 | 5/2018 | Matolin et al. |
| 2010/0182468 A1 | 7/2010 | Posch et al. |
| 2015/0380451 A1* | 12/2015 | Kurokawa ........ H01L 27/14616 257/43 |
| 2016/0094796 A1* | 3/2016 | Govil ................... H04N 5/3456 348/295 |
| 2018/0189959 A1* | 7/2018 | Berner ...................... G01J 1/46 |
| 2021/0195130 A1* | 6/2021 | Niwa ................... H04N 5/3745 |

FOREIGN PATENT DOCUMENTS

| | | |
|---|---|---|
| WO | WO 2014/091040 A1 | 6/2014 |
| WO | WO 2015/036592 A1 | 3/2015 |
| WO | WO 2017/174579 A1 | 10/2017 |
| WO | WO 2019/211317 A1 | 7/2019 |

OTHER PUBLICATIONS

Written Opinion of the International Searching Authority dated Feb. 1, 2020 for PCT/EP2019/067264, filed on Jun. 27, 2019 (8 pages).

Li et al., "Design of an RGBW Color VGA Rolling and Global Shutter Dynamic and Active-Pixel Vision Sensor", IEEE International Symposium on Circuits and Systems, May 24, 2015.

M. Sakakibara et al., "A back-illuminated global-shutter CMOS image sensor with pixel-parallel 14b subthreshold ADC," 2018 IEEE International Solid—State Circuits Conference—(ISSCC), Feb. 12, 2018, pp. 80-82.

* cited by examiner

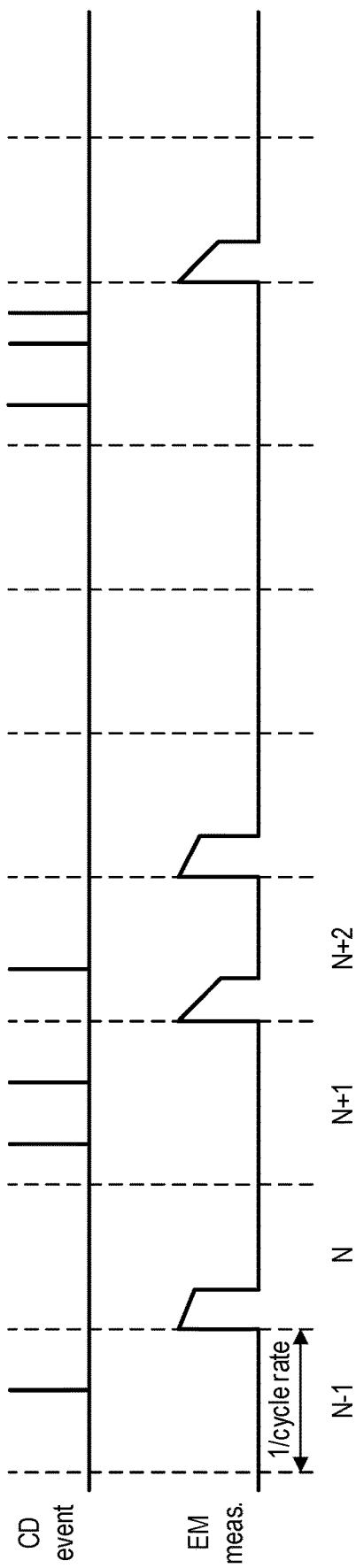

IMAGE SENSOR WITH A PLURALITY OF SUPER-PIXELS

CROSS-REFERENCE TO RELATED APPLICATION(S)

This application is a U.S. National Stage application of International Application No. PCT/EP2019/067264, filed Jun. 27, 2019, which claims priority to U.S. Application No. 62/690,948, filed Jun. 27, 2018, and U.S. Application No. 62/780,913, filed Dec. 17, 2018. Each of the above-referenced applications is expressly incorporated herein by reference in its entirety.

TECHNICAL FIELD

The present disclosure relates generally to the field of image sensing. More specifically, and without limitation, this disclosure relates to systems and methods for providing super-pixels, and implementing and using image sensors with super-pixels. The image sensors and techniques disclosed herein may be used in various applications and vision systems, such as security systems, autonomous vehicles, and other systems that benefit from rapid and efficient motion detection and motion event-driven image data acquisition.

BACKGROUND

Extant image sensors use a plurality of pixels including semiconductor charge-coupled devices (CCD), complementary metal-oxide-semiconductor (CMOS) sensors, N-type metal-oxide-semiconductor (NMOS) sensors, or other sensors in order to capture digital images of scenes.

These conventional image sensors may acquire the visual information time-quantized at a predetermined frame rate. Thus, each typical frame carries the information from all pixels, regardless of whether or not this information has changed since the last frame has been acquired. This approach typically results, depending on the dynamic contents of the scene, in a more-or-less high degree of redundancy in the recorded image data as all unchanged pixel values are also re-acquired and re-transmitted every time even though they are already known. In a conventional image sensor, the pixels typically have no way to determine that the value they measure has not changed. The problem tends to worsen as modern image sensors advance to ever higher spatial and temporal resolution. Also, the hardware required for post-processing of the data typically increases in complexity and cost, demand on transmission bandwidth and data storage capacity similarly surges and the power consumption rises, leading to limitations in many kinds of vision applications, from demanding high-speed industrial vision systems to mobile, battery-powered consumer devices.

One existing approach for reducing temporal redundancy in video data is frame difference encoding. This form of video compression typically includes transmitting only pixel values that exceed a defined intensity change threshold from frame to frame after an initial key-frame. Extant frame differencing systems usually rely on acquisition and processing of full frames of image data and are not able to self-consistently suppress temporal redundancy and provide real-time compressed video output from the sensor.

Indeed, many vision applications do not require full images but benefit from fast image data from parts of the scene where changes or motion are detected. For example, security systems or other vision systems may only be interested in motion data and not in portions of the image having no motion. In another example, autonomous vehicles must process captured data quickly and efficiently in order to make decisions comparable with human perception time (generally on the order of milliseconds). Such efficiency is capped when large amounts of data must be discarded (e.g., via post-processing) in order to obtain the portion of captured data relevant to the situation.

Other extant solutions include time-based asynchronous image sensors whose pixels produce detections in response to particular conditions determined by detectors within the pixels. However, such pixels still output analog signals or time-based signals derived from such analog signals. These output signals are prone to losing image quality when high activity happens in the scene and must be post-processed into digital data for practical use. Accordingly, post-processing costs increase significantly as spatial and temporal resolutions are increased.

SUMMARY

Embodiments of the present disclosure may provide a method and a device for continuous acquisition of visual information of an observed scene with high temporal resolution, thereby generating less data volume by reducing redundancy. Thus, the generated data may, rather than comprising a succession of frames containing the image information of all pixels, comprise a stream of change and light intensity information of individual pixels, which are recorded and transmitted when a change exceeding a threshold in light intensity in the field of view of the individual pixel has been detected by the pixel itself. Accordingly, embodiments of the present disclosure may lead to a substantial reduction of generated data through suppression of the temporal redundancy in the picture information that is typical for conventional image sensors, while still providing data containing comparable, or even higher, information content.

The reduction in data to be output from the pixel array due to the suppression of redundant data as described above may allow for increasing the rate of exposure measurements at each pixel, e.g., from 30 times per second or 60 times per second (which are frame-rates of typical CMOS image sensors) to higher rates such as 1000 times per second, 10000 times per second and more, a rate for each pixel individually depending on the activity in the field of view of the respective pixel as detected by the pixel's condition detector (as explained below) that may detect conditions at such rates. The conditional readout and analog-to-digital (AD) conversion of exposure measurement results from individual pixels at such rates is a challenging task which is difficult to be solved with standard techniques in which AD conversion is performed outside the pixel array, either at column level or at sensor level.

Embodiments of the present disclosure may use pixel-individually auto-sampling (self-triggered) super-pixels. As used herein, auto-sampling may refer to each individual pixel autonomously deciding when to acquire image information. For example, the pixel may be equipped with a (condition) detector (CD) that individually and, independently of detectors of other pixels, detects a condition of the pixel's input light signal (e.g., a change in intensity of a certain magnitude) and initiates an exposure measurement in the exposure measurement (EM) part(s) of the pixel. This functionality may allow for a new light exposure level to be measured and/or communicated pixel-individually when the light impinging on the pixel's photosensitive element (e.g. a photodiode) has met the defined criterion, (e.g., has changed more than a threshold since the last measurement), the event of which is detected by the pixel itself, e.g., by its (condition) detector.

In order to benefit from recent advancements in photodiode and CMOS pixel technology (e.g., use of a pinned photodiode (PPD) pixel, a global-shutter pixel, or the like), the EM part of a super-pixel of embodiments of the present disclosure may be based on standard (4T, 5T) active pixel sensor (APS) pixels and may not share the photodiode with the CD. For example, the combination of one CD with one EM into one "super-pixel" is one possible arrangement.

The results of the exposure measurement(s) of the EM part(s) usually need to be converted into digital form at some point. One flexible solution is to include one full ADC within each super-pixel. This arrangement with local ADC in each pixel may avoid having to drive a long column readout line with an analog signal, which generally takes time and consumes power. In addition, pixel-level ADC may allow one-shot multi-exposure for high-definition resolution (HDR) and/or red/green/blue (RGB) color acquisition as described further below.

In view of the foregoing, embodiments of the present disclosure provide super-pixels for use in image sensors. As disclosed herein, the super-pixels may include analog-to-digital converters in order to directly output digital data or measurements. Accordingly, the amount of post-processing on the signals may be significantly reduced to thereby decrease the data volume and increase the efficiency of the sensor. Further, in order to effect such conversion without exponentially increasing power consumption, the converters may be power-cycled by a condition detector within each super-pixel. This allows for practical implementation of the converter in each super-pixel. In addition, the analog-to-digital converter of each super-pixel can be triggered by an external control signal. Accordingly, readouts may be pulled for areas of interest and on-demand rather than based on detected triggers or conditions.

In some embodiments, a super-pixel is provided that comprises a plurality of exposure measurement circuits paired with a single condition detector. By arranging the super-pixel in this way, high-resolution and/or color images may be detected and read out from an image sensor incorporating such super-pixels. The images are read off directly as digital data, thereby reducing the need for analog-to-digital conversion by an auxiliary circuit.

According to an exemplary embodiment of the present disclosure, an image sensor is provided that includes a plurality of super-pixels. Each super-pixel may comprise a first photosensitive element, and a detector that is electrically connected to the first photosensitive element and configured to generate a trigger signal when an analog signal proportional to brightness of light impinging on the first photosensitive element matches a condition. The super-pixel may further include a second photosensitive element and an exposure measurement circuit that is electrically connected to the second photosensitive element and configured to convert an analog signal proportional to brightness of light impinging on the second photosensitive element to a digital signal. Further, the super-pixel may include a logic circuit that is electrically connected to the detector and the exposure measurement circuit and configured to enable the exposure measurement circuit (or parts of the exposure measurement circuit) in response to the trigger signal, and to disable the exposure measurement circuit (or parts of the exposure measurement circuit) when the digital signal is read out from the exposure measurement circuit.

In some embodiments, the exposure measurement circuit may include an analog-to-digital circuit configured to convert the analog signal proportional to the brightness of the light impinging on the second photosensitive element to the digital signal. For example, the analog-to-digital circuit may comprise a digital ramp analog-to-digital circuit. In such embodiments, the analog-to-digital circuit may comprise a single-slope ramp analog-to-digital circuit.

In any of the above embodiments, the analog-to-digital circuit may be further configured to output the digital signal to an external readout system. In such embodiments, the analog-to-digital circuit may be further configured to disable after output. For example, the analog-to-digital circuit may be further configured to send a signal to reset the logic circuit in response to the output such that the analog-to-digital circuit disables.

In any of the above embodiments, the external readout system may request the output from the analog-to-digital circuit based on a clocked circuit.

In any of the above embodiments, the analog-to-digital circuit may be further configured to send a signal to reset the logic circuit after it has received a signal from the logic circuit to initiate the conversion of the analog signal to the digital signal. Additionally, or alternatively, the logic circuit may be further configured to enable the exposure measurement circuit (or parts of it) in response to an external control signal.

In any of the above embodiments, the detector may be further configured to output the trigger signal to an external readout system. In such embodiments, the external readout system may be configured to send an acknowledgment signal to the detector in response to receiving the trigger signal, and the detector may be further configured to reset in response to the acknowledgment signal.

In any of the above embodiments, the logic circuit may comprise a control logic that is electrically connected to the detector and a switch that is controlled by the control logic. In such embodiments, the control logic may be further electrically connected to an analog-to-digital converter of the exposure measurement circuit.

In any of the above embodiments, the logic circuit may comprise a control logic that is electrically connected to the detector and a logic gate that is connected to the control logic and to an external controller. In such embodiments, the control logic may be further electrically connected to an analog-to-digital converter of the exposure measurement circuit.

In any of the above embodiments, an external readout system may request output from the exposure measurement circuit in accordance with a circuit clock, and the exposure measurement circuit may be configured to output a digital signal in response to the request. For example, the digital signal may indicate when the detector has not triggered since a previous request. In such embodiments, the external readout system may send at least one control signal to cause the exposure measurement circuit to convert an analog signal proportional to brightness of light impinging on the second photosensitive element to digital data when a threshold number of digital signals indicating the detector has not triggered are received.

According to another exemplary embodiment of the present disclosure, an image sensor is provided that includes a plurality of super-pixels. Each super-pixel may comprise a first photosensitive element; a detector that is electrically connected to the first photosensitive element and configured to generate a trigger signal when an analog signal proportional to brightness of light impinging on the first photosensitive element matches a condition; a plurality of second photosensitive elements; and at least one exposure measurement circuit that is electrically connected to the plurality of second photosensitive elements and configured to convert an analog signal proportional to brightness of light impinging on one or more of the second photosensitive elements to a digital signal in response to the trigger signal.

In some embodiments, the plurality of second photosensitive elements may output respective analog signals to separate capacitor nodes of the exposure measurement circuit. In such embodiments, at least two of the plurality of second photosensitive elements may have different gains.

Additionally or alternatively, the plurality of second photosensitive elements may integrate charge onto respective nodes at different times. In such embodiments, the plurality of second photosensitive elements may output respective analog signals to the same capacitor node of the exposure measurement circuit.

In any of the embodiments above, at least two plurality of second photosensitive elements may include different light filters (e.g., density filters, polarization filters, or the like). Additionally or alternatively, at least two plurality of second photosensitive elements may include different color filters (or other wavelength filters such as infrared stop filters, infrared pass filters, or the like).

In any of the embodiments above, the at least one exposure measurement circuit may include an analog-to-digital circuit configured to convert the analog signal proportional to the brightness of the light impinging on one or more of the second photosensitive elements to the digital signal. In such embodiments, the analog-to-digital circuit may comprise a digital ramp analog-to-digital circuit, such as a single-slope ramp analog-to-digital circuit. Additionally or alternatively, the analog-to-digital circuit may comprise at least one comparator. In such embodiments, the comparator may comprise a first transistor of the analog-to-digital circuit coupled with at least one transistor associated with each of the second plurality of second photosensitive elements. Such embodiments may further comprising at least one reset transistor associated with each of the second plurality of second photosensitive elements, and the at least one exposure measurement circuit may be further configured to output a reset voltage of each reset transistor before outputting the digital signal. For example, the at least one exposure measurement circuit may output the reset voltage of each reset transistor sequentially. Additionally or alternatively, a readout circuit may be configured to perform a correlated double sampling (CDS) correction for noise and mismatch on the digital signal using the output reset voltages.

According to another exemplary embodiment of the present disclosure, a super-pixel is provided for use in an image sensor. The super-pixel may comprise an asynchronous unit comprising: a first photosensitive element, and a detector that is electrically connected to the first photosensitive element and configured to generate a trigger signal when an analog signal proportional to brightness of light impinging on the first photosensitive matches a condition. The super-pixel may further comprise a synchronous unit comprising: at least one second photosensitive element, and an exposure measurement circuit that is electrically connected to the at least one second photosensitive element and configured to convert an analog signal proportional to brightness of light impinging on the at least one second photosensitive element to a digital signal. The super-pixel may further comprise a logic circuit that is electrically connected to the asynchronous unit and configured to enable the synchronous unit in response to the trigger signal and to disable the synchronous unit when the digital signal is read out from the synchronous unit.

According to another exemplary embodiment of the present disclosure, a method for controlling an image sensor having a plurality of super-pixels is provided. The method may comprise receiving a first analog signal proportional to light impinging on a first photosensitive element; generating a trigger signal when the first analog signal matches a condition; in response to the trigger signal, enabling an exposure measurement circuit; receiving at least one second analog signal proportional to light impinging on at least one second photosensitive element; using the exposure measurement circuit, converting the at least one second analog signal to a digital signal; after the conversion of the at least one second analog signal to the digital signal, disabling the exposure measurement circuit; and outputting the digital signal to an external readout system.

In some embodiments, the conversion may be performed using an analog-to-digital circuit included in the exposure measurement circuit. In such embodiments, the analog-to-digital circuit may comprise a digital ramp analog-to-digital circuit. For example, the analog-to-digital circuit may comprise a single-slope ramp analog-to-digital circuit.

In some embodiments, the method may further comprise outputting, using the analog-to-digital circuit, the digital signal to an external readout system. In such embodiments, the method may further comprise disabling the analog-to-digital circuit after output.

In any of the above embodiments, the method may further comprise receiving a request for the output from the external readout system based on a clocked circuit.

In any of the above embodiments, the method may further comprise sending, using the analog-to-digital circuit, a signal to reset the logic circuit in response to the output such that the analog-to-digital circuit disables. Additionally or alternatively, the method may further comprise sending, using the analog-to-digital circuit, a signal to reset the logic circuit after completing the conversion of the analog signal to the digital signal.

In any of the above embodiments, the method may further comprise enabling the exposure measurement circuit in response to an external control signal using the logic circuit.

In any of the above embodiments, the method may further comprise outputting, using the detector, the trigger signal to an external readout system. In such embodiments, the method may further comprise receiving, using the detector, an acknowledgment signal from the external readout system in response to the trigger signal, and resetting the detector response to the acknowledgment signal.

In any of the above embodiments, the logic circuit may comprise a control logic that is electrically connected to the detector and a switch that is controlled by the control logic. In such embodiments, the control logic may be further electrically connected to an analog-to-digital converter of the exposure measurement circuit.

In any of the above embodiments, the logic circuit may comprise a control logic that is electrically connected to the detector and a logic gate that is connected to the control logic and to an external controller. In such embodiments, the control logic may be further electrically connected to an analog-to-digital converter of the exposure measurement circuit.

In any of the above embodiments, the method may further comprise receiving a request for the exposure measurement circuit from an external readout system output in accordance with a circuit clock, and outputting a digital signal in response to the request. For example, the digital signal may indicate when the detector has not triggered since a previous request. In such embodiments, the method may further comprise receiving, from the external readout system, at least one control signal to cause the exposure measurement circuit to convert an analog signal proportional to brightness of light impinging on the second photosensitive element to digital data when a threshold number of digital signals indicating the detector has not triggered are received.

According to another exemplary embodiment of the present disclosure, an image sensor is provided that includes a plurality of super-pixels. Each super-pixel may comprise a first photosensitive element, and a detector that is electrically connected to the first photosensitive element and configured to generate a trigger signal when a first analog signal proportional to brightness of light impinging on the first photosensitive element matches a condition. The super-pixel may further comprise a second photosensitive element, and an exposure measurement circuit that is electrically connected to the second photosensitive element and configured to convert a second analog signal proportional to brightness of light impinging on the second photosensitive element to a digital signal. The super-pixel may further comprise at least one latch configured to enable when a value of a third analog signal proportional to brightness of light impinging on the first photosensitive element meets the condition during conversion of the second analog signal to the digital signal. The exposure measurement circuit may be configured to, in response to the trigger signal, convert the second analog signal in a first cycle and, in response to enablement of the at least one latch, convert a fourth analog signal proportional to brightness of light impinging on the second photosensitive element to a digital signal in a second cycle. In some embodiments, the exposure measurement circuit may include an analog-to-digital circuit configured to convert the second and fourth analog signals proportional to the brightness of the light impinging on the second photosensitive element to the digital signals.

In such embodiments, the at least one latch may include a logic circuit with a first latch configured to activate the first cycle of the analog-to-digital circuit in response to the trigger signal and a second latch configured to activate and clear in response to signals from the analog-to-digital circuit; and the analog-to-digital circuit may be configured to set the second latch and clear the first latch when beginning the first cycle. Moreover, an external readout system may initiate a readout with the analog-to-digital circuit when the second latch is set. Additionally or alternatively, the analog-to-digital circuit may be configured to begin the second cycle in response to activation of the first latch during the first cycle. Additionally or alternatively, the analog-to-digital circuit may be further configured to disable, after the first cycle, when the first latch is not activated.

In some embodiments, the at least one latch may be configured to activate in response to the trigger signal and clear in response to signals from the analog-to-digital circuit; the analog-to-digital circuit may be configured to poll the at least one latch at the beginning of each cycle to determine whether to begin a conversion; and the analog-to-digital circuit may be configured to set an internal latch and clear the at least one latch when beginning a conversion. In such embodiments, an external readout system may initiate a readout with the analog-to-digital circuit when the internal latch is set. Additionally or alternatively, the internal latch may comprise a single latch of a plurality of latches used in the conversion. Additionally or alternatively, the analog-to-digital circuit may be further configured to disable during a cycle at the beginning of which the at least one latch is not activated.

In some embodiments, the at least one latch may be external to the first photosensitive element, the detector, the second photosensitive element, the exposure measurement circuit, and the logic circuit. In such embodiments, the at least one latch of each super-pixel may form a memory array external to the plurality of super-pixels. In such embodiments, the at least one latch may be connected to the exposure measurement circuit using at least one of a direct wiring connection or one or more arbiters associating a memory address of the at least one latch with an address of a corresponding super-pixel. Additionally or alternatively, the at least one latch may be configured to activate in response to the trigger signal and clear in response to signals from an external readout; the analog-to-digital circuit may be configured to perform a conversion at each cycle; and the external readout may be configured to readout conversions form the analog-to-digital circuit only when the at least one latch is activated.

In any of the embodiments above, the at least one latch may comprise at least one bit of static random access memory (SRAM).

According to another exemplary embodiment of the present disclosure, a readout system is provided for an image sensor. The readout system may comprise a first array of measurement readouts configured to output digital signals, and a second array of latches associated with the measurement readouts and configured to activate upon receipt of a trigger signal from the associated measurement readouts. The readout system may further comprise a clocked circuit configured to clock one or more measurements readouts of the first array of measurement readouts based on which latches of the second array are activated. The second array of latches may be configured to deactivate upon being clocked.

In some embodiments, the readout system may further comprise a plurality of switches configured to connect the clocked circuit to measurement readouts of the first array when corresponding latches are activated. Additionally or alternatively, the second array may be external to the first array For example, the second array comprises a static random access memory (SRAM) array of one bit or larger cells.

In any of the embodiments above, the second array may be formed on the same chip as the first array. Additionally or alternatively, the clocked circuit may be further configured to skip a clock cycle when no latches of the second array are activated.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate various embodiments and, together with the description, serve to explain the principles and features of the disclosed embodiments. In the drawings:

FIG. 12 is a graphical illustration of the general temporal relations between arbitrary asynchronous detection events (CD) and related (triggered) exposure measurements (EM) in successive control cycles N, according to embodiments of the present disclosure.

DETAILED DESCRIPTION

The disclosed embodiments relate to systems and methods for providing super-pixels, and implementing and using image sensors with super-pixels. Advantageously, the exemplary embodiments can provide fast and efficient image and event sensing directly output in digital format. Embodiments of the present disclosure may be implemented and used in various applications and vision systems, such as security systems, autonomous vehicles, and other systems that benefit from rapid and efficient motion detection and motion event-driven image data acquisition.

Although embodiments of the present disclosure are described with general reference to an imaging system, it will be appreciated that such a system may part of a camera, a LIDAR, or other imaging system.

Figure 1A:
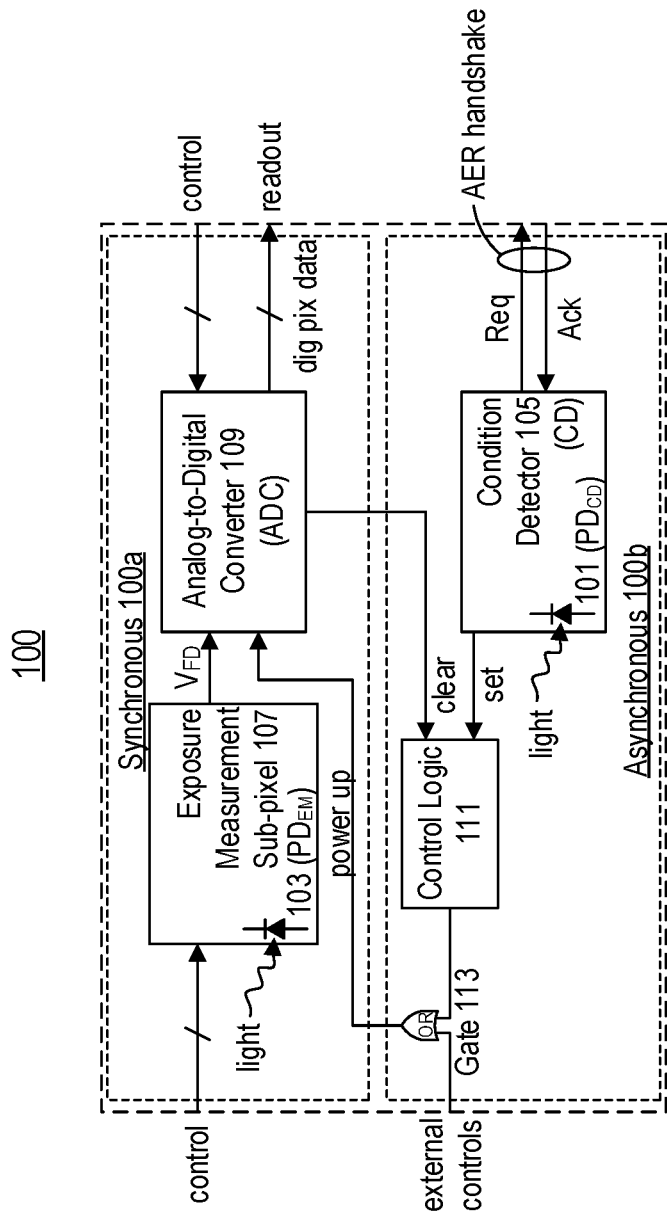
FIG. 1A is a schematic representation of an exemplary super-pixel, according to embodiments of the present disclosure.

FIG. 1A is a schematic representation of an exemplary super-pixel 100, consistent with embodiments of the present disclosure. As used herein, a "super-pixel" refers to a smallest element of an image sensor that outputs digital data based on light impinging on the super-pixel. In some embodiments, a super-pixel may be larger or include more components than a conventional "pixel" because it may include two or more photosensitive elements, e.g., elements 101 and 103, as well as a condition detector 105, an ADC 109 and control and communication logic, such as 111, 113.

A photosensitive element may comprise a photodiode (e.g., a p-n junction or PIN structure) or any other element configured to convert light into an electrical signal. Each photodiode (e.g., element 101 or element 103) may generate a current (e.g., $I_{ph}$) proportional to the intensity of light impinging on the photodiode.

As shown in the example of FIG. 1A, the super-pixel includes a synchronous unit 100a and an asynchronous unit 100b. The asynchronous unit 100b may include a photosensitive element 101 ($PD_{CD}$, e.g., a photodiode), and the synchronous unit 100a may include at least one photosensitive element 103 ($PD_{EM}$, e.g., a photodiode).

The asynchronous unit 100b may further include a condition detector 105 (CD). As shown in the example of FIG. 1A, the detector 105 is electrically connected to a first photosensitive element 101 ($PD_{CD}$) and is configured to generate a trigger signal (labeled "set" in the example of FIG. 1A) when an analog signal proportional to brightness of light impinging on the first photosensitive element 101 matches a condition. For example, the condition may comprise whether the analog signal exceeds a threshold (e.g., a voltage or current level). The analog signal may comprise a voltage signal or a current signal.

The synchronous unit 100a may include an exposure measurement sub-pixel 107. The exposure measurement sub-pixel 107 may be configured to generate an analog measurement proportional to brightness of light impinging on a second photosensitive element 103 ($PD_{EM}$). Although depicted as a voltage signal $V_{FD}$ in FIG. 1A, the analog measurement may alternatively comprise a current signal. The synchronous unit 100a may further include an analog-to-digital converter (ADC) 109 for converting the analog measurement to digital data (labeled "dig pix data" in the example of FIG. 1A). The combination of the exposure measurement sub-pixel 107 and the ADC 109 may be referred to as "an exposure measurement circuit." Accordingly, the exposure measurement circuit may be electrically connected to the second photosensitive element 103 ($PD_{EM}$) and configured to convert an analog signal proportional to brightness of light impinging on the second photosensitive element 103 to a digital signal. Unlike the asynchronous unit 100b, which outputs based on the condition detected by condition detector CD, the synchronous unit 100a may be clocked, e.g., such that digital data is output from the ADC only according to a clock cycle. In some embodiments, the exposure measurement sub-pixel 107 may also be clocked such that the signal from the second photosensitive element 103 ($PD_{EM}$) is converted to an analog signal only according to the clock cycle.

As further shown in FIG. 1A, upon detection of the condition, condition detector 105 (CD) may send a signal (labeled "set" in the example of FIG. 1A) to a control logic 111 forming part of asynchronous unit 100b. The control logic 111 may trigger a switch (not shown) and/or a logic gate 113 (depicted as an "OR" gate in the example of FIG. 1A) to enable (or "power up" as depicted in the example of FIG. 1A) the ADC 109. As used herein, "enable" may refer to an activation such that ADC 109 may use incoming ADC control signals, ramp codes, or the like to perform the conversion. Accordingly, the ADC control signals, ramp codes, and the like may be continuously input into ADC 109 for use upon enablement.

The combination of the control logic 111 and the switch (not shown) and/or logic gate 113 may be referred to as a "logic circuit." Accordingly, the logic circuit may be electrically connected to the detector 105 and the exposure measurement circuit and configured to enable the exposure measurement circuit (or, in particular, the ADC 109 of the exposure measurement circuit) in response to the trigger signal (labeled "set" in the example of FIG. 1A) and to disable the exposure measurement circuit (or, in particular, the ADC 109 of the exposure measurement circuit) when the digital signal (labeled "dig pix data") is read out from the exposure measurement circuit. In some embodiments, the logic circuit may temporarily enable the exposure measurement circuit (or, in particular, the ADC 109 of the exposure measurement circuit) such that the exposure measurement circuit (or, in particular, the ADC 109 of the exposure measurement circuit) automatically disables after outputting the digital signal.

Accordingly, after reading out the digital data to an external readout system (not shown), the ADC 109 may generate a reset signal (labeled "clear" in the example of FIG. 1A) that is sent to the control logic 111. The control logic 111 may thus trigger the switch (not shown) and/or the logic gate 113 to disable (or "power down" as depicted in the example of FIG. 1A) the ADC 109. As used herein, "disable" may refer to a deactivation such that ADC 109 uses incoming ADC control signals, ramp codes, or the like to perform the conversion. However, the ADC control signals, ramp codes, and the like may still be input into ADC 109 after disablement.

In some embodiments, the logic circuit of control logic 111 may temporarily enable the synchronous unit 100a (or, in particular, the ADC 109 of the synchronous unit 100a) such that the synchronous unit 100a (or, in particular, the ADC 109 of the synchronous unit 100a) automatically disables after outputting the digital signal. For example, the reset signal (labeled "clear" in the example of FIG. 1A) may be sent from the ADC 109 to the logic circuit of control logic 111 after being enabled by the logic circuit in response to the trigger signal (labeled "set" in the example of FIG. 1A) such that the logic circuit becomes ready to receive a new "set" signal from the condition detector 105.

As further shown in FIG. 1A, the condition detector 105 (CD) may communicate the trigger signal to the external readout system (shown as "Req" in the example of FIG. 1A). The condition detector 105 (CD) may receive an acknowledgment signal (shown as "Ack" in the example of FIG. 1A) that is then used to reset the condition detector 105 (CD) such that the condition may again be detected and the trigger generated. In some embodiments, the external readout system may also send control signals to the exposure measurement sub-pixel 107 and/or the ADC 109. All communications with the external readout system may be governed by a protocol, such as an address-event representation (AER) protocol and/or may be governed by clock cycles. Accordingly, the external readout system may comprise an event readout system configured to read data from the super-pixels asynchronously and/or may comprise a clocked readout system configured to read data from the super-pixels during predetermined clock cycles.

As further shown in FIG. 1A, external controls may also be provided to the switch (not shown) and/or the logic gate 113 (or to the control logic 111) in order to activate a readout. For example, if the super-pixel 100 has not returned a readout after a threshold number of clock cycles (e.g., if the condition has not been met after the threshold number of clock cycles), the external readout system may send a control signal to force a readout. Additionally or alternatively, the external readout system may operate in a standard frame mode such that the super-pixels or at least a group of super-pixels (e.g., super-pixel 100) are triggered in order to capture a full or partial frame regardless of whether the condition is detected.

Figure 1B:
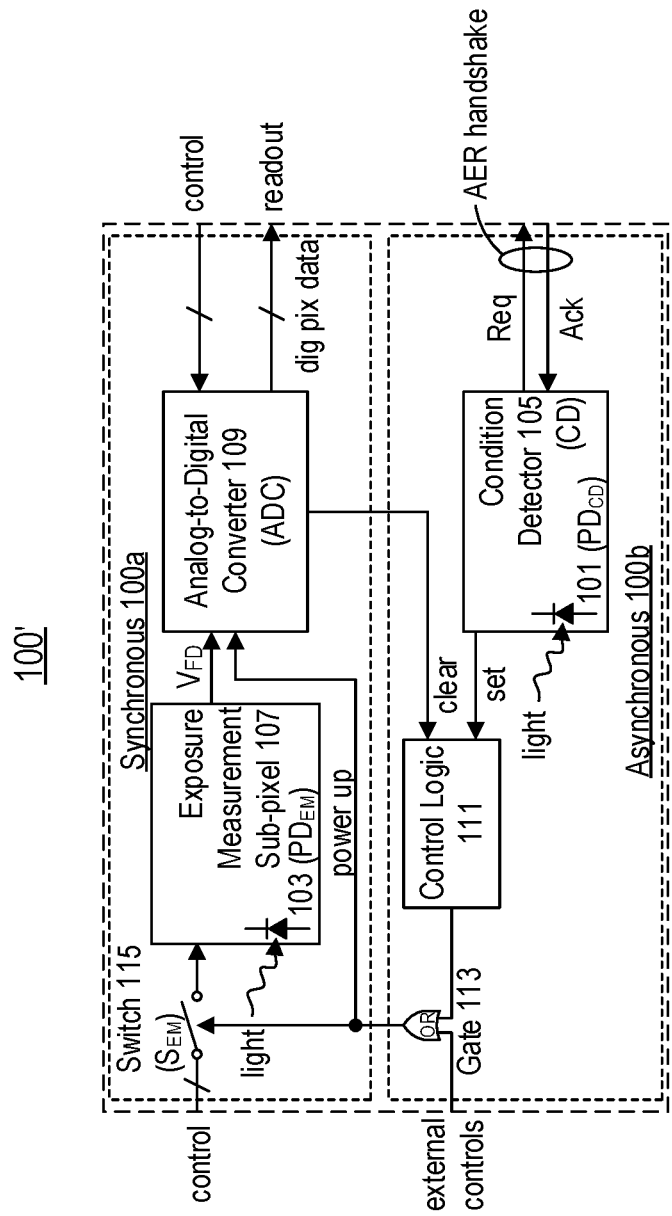
FIG. 1B is a schematic representation of another exemplary super-pixel, according to embodiments of the present disclosure.

FIG. 1B is another exemplary super-pixel 100', consistent with embodiments of the present disclosure. The super-pixel 100' of FIG. 1B functions similarly to the super-pixel 100 of FIG. 1A, but further includes a switch 115 (SEM) along with the OR gate 113 in the control circuit. Accordingly, using external control signal applied to switch 115, the super-pixel 100' of FIG. 1B may also suppress the exposure measurement sub-pixel 107 whenever the ADC 109 is disabled.

Figure 1C:
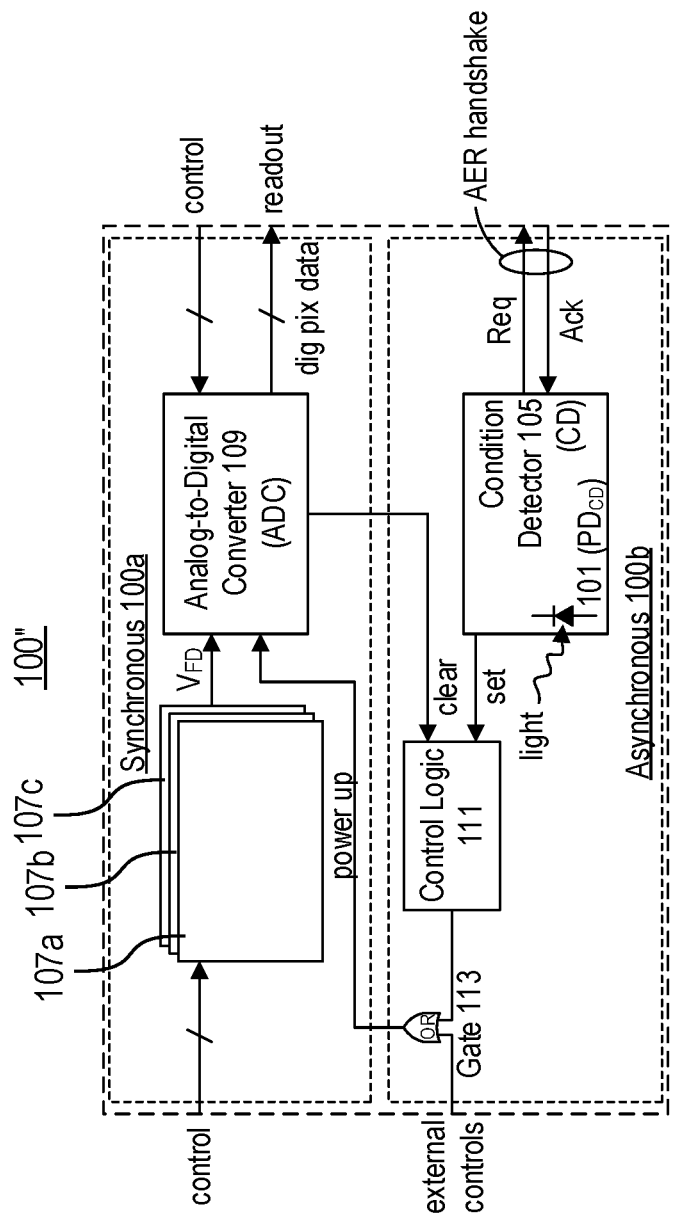
FIG. 1C is a schematic representation of yet another exemplary super-pixel, according to embodiments of the present disclosure.

FIG. 1C depicts yet another exemplary super-pixel 100", consistent with embodiments of the present disclosure. The super-pixel 100" of FIG. 1C functions similarly to the super-pixel 100 of FIG. 1A, but further includes a plurality of exposure measurement sub-pixels, e.g., sub-pixels 107a, 107b, and 107c. Although depicted with three exposure measurement sub-pixels, the embodiment depicted in FIG. 1C may be implemented with any number of sub-pixels paired with ADC 109. Accordingly, the embodiment of FIG. 1C may allow for more accurate data to be captured, e.g., by averaging, summing, or otherwise combining the measurements from the plurality of exposure measurement sub-pixels before converting the combined measurement to the digital signal. Additionally or alternatively, the measurements from the plurality of exposure measurement sub-pixels may be converted to digital signals sequentially to achieve a higher resolution.

Figure 1D:
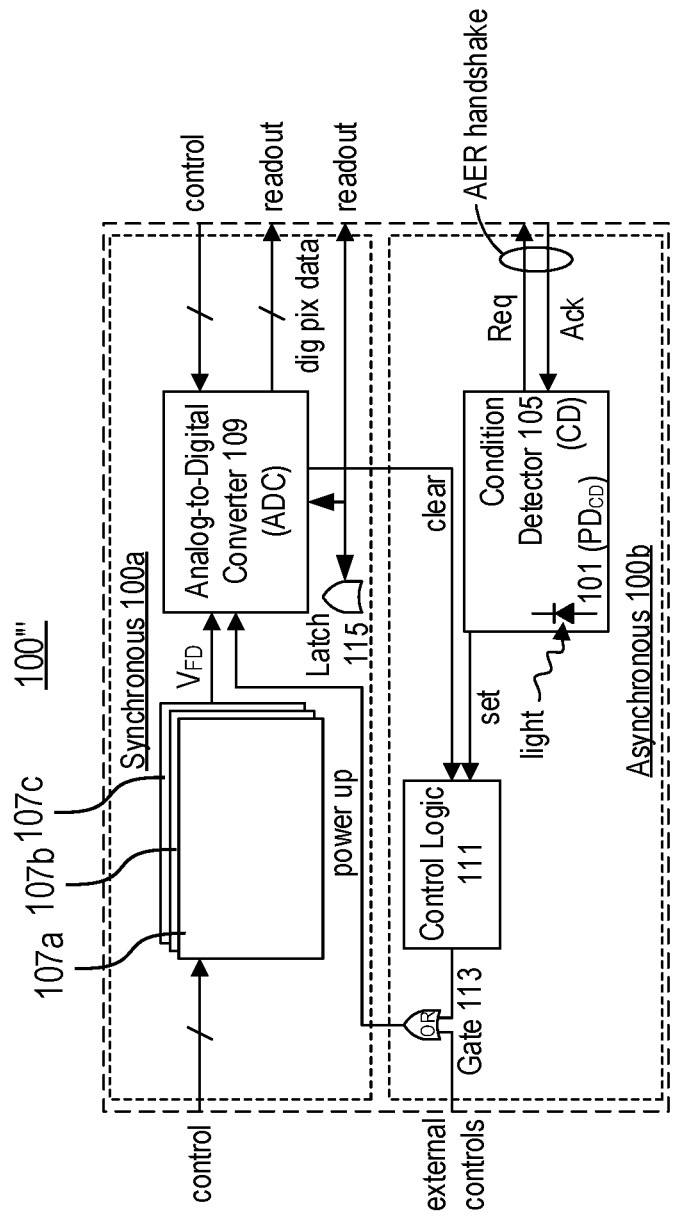
FIG. 1D is a schematic representation of a still further exemplary super-pixel, according to embodiments of the present disclosure.

FIG. 1D depicts yet another exemplary super-pixel 100''', consistent with embodiments of the present disclosure. The super-pixel 100''' of FIG. 1D functions similarly to the super-pixel 100" of FIG. 1C, but further includes a latch 115. Latch 115 may, for example, comprise a switch (e.g., one or more transistors configured to function as a switch), one or more bits of static random access memory (SRAM), or the like. Although depicted as separate from the ADC 109, in some embodiments, latch 115 may comprise at least one latch of n-bit latches provided in ADC 109 (e.g., as described below with respect to ADC 300 of FIG. 3A).

In one embodiment, the trigger signal (labeled "set" in the example of FIG. 1D) may cause control logic 111 to activate during a first cycle N−1. In response, the control logic 111 may send an enablement signal (labeled "power up" in the example of FIG. 1D) to ADC 109. In response, ADC 109 may begin conversion of an analog signal from one or more exposure measurement sub-pixels (e.g., sub-pixels 107a, 107b, and 107c) in a second cycle N. Additionally, ADC 109 may set latch 115 and send a signal to control logic 111 (labeled "clear" in the example of FIG. 1D) at or before beginning cycle N such that control logic 111 is ready to generate a new trigger signal any time during cycle N. Accordingly, a new exposure/conversion becomes possible already in a third cycle N+1, as depicted in the example of FIG. 12 and explained further below. Latch 115 is further connected to the readout system (e.g., over the "dig pixel data" bus depicted in FIG. 1D) in order to signal the readout system to perform a read out at the end of cycle N. Accordingly, when the readout system pulls the digital signal from ADC 109 at the end of cycle N, latch 115 may be cleared by ADC 109.

In another embodiment, rather than sending the "power up" signal to ADC 109, control logic 111 may activate latch 115. In such embodiments, ADC 109, at the beginning of each cycle, may poll the status of latch 115 to determine whether to perform a conversion in the cycle. In embodiments where ADC 109 disables rather than operates continuously, ADC 109 may disable for a cycle if latch 115 is not activated at the start of said cycle. If ADC 109 polls latch 115 and latch 115 is enabled, ADC 109 may clear latch 115 and begin conversion of an analog signal from one or more exposure measurement sub-pixels (e.g., sub-pixels 107a, 107b, and 107c). In such embodiments, ADC 109 may further set an internal status bit to notify the readout system to perform a read out at the end of the cycle. After the readout, ADC 109 may disable itself and, at the beginning of the next cycle, again poll latch 115 to determine whether to re-enable for another cycle. Alternatively, ADC 109 may poll latch 115 before disabling to determine whether to stay enabled for another conversion or to disable.

In another embodiment (not depicted in FIG. 1D0, latch 115 may be external to super-pixel 100'''. In such embodiments, super-pixel 100''' may exclude control logic 111. Instead, detector 105 may activate latch 115 in response to the condition being satisfied, and ADC 109 may continuously perform a conversion each cycle. Accordingly, the readout system may use latch 115 to determine whether to perform a read out at the end of each cycle. Otherwise, a conversion performed by ADC 109 may be deleted without being read out. Although such an embodiment may use additional power for each ADC cycle, super-pixel 100''' may be made smaller by eliminated control logic 111 and using a smaller array of external latches such as latch 115.

In embodiments where latch 115 is external to super-pixel 100''', latch 115 may be connected to super-pixel 100''' using at least one of a direct wiring connection or one or more arbiters. For example, latch 115 may form part of an array of external latches such that the one or more arbiters may associate a memory address of latch 115 with an address of a corresponding super-pixel (e.g., super-pixel 100''').

Although depicted with three exposure measurement sub-pixels (e.g., sub-pixels 107a, 107b, and 107c), the embodiment depicted in FIG. 1D may be implemented with any number of sub-pixels paired with ADC 109, e.g., one sub-pixel, two sub-pixels, four sub-pixels, etc.

The exemplary super-pixels 100, 100', 100" and 100''' of FIGS. 1A, 1B, 1C, and 1D, respectively, may be arranged in one or more arrays to form image or event sensors. For example, the super-pixels may be arranged in one or more rows and one or more columns with respective row and column clock circuits for readout of digital data from the ADCs to the external readout system. In another example, the super-pixels may be arranged in a star pattern with clock circuits for each node of the star for readout of digital data from the ADCs to the external readout system.

Figure 2A:
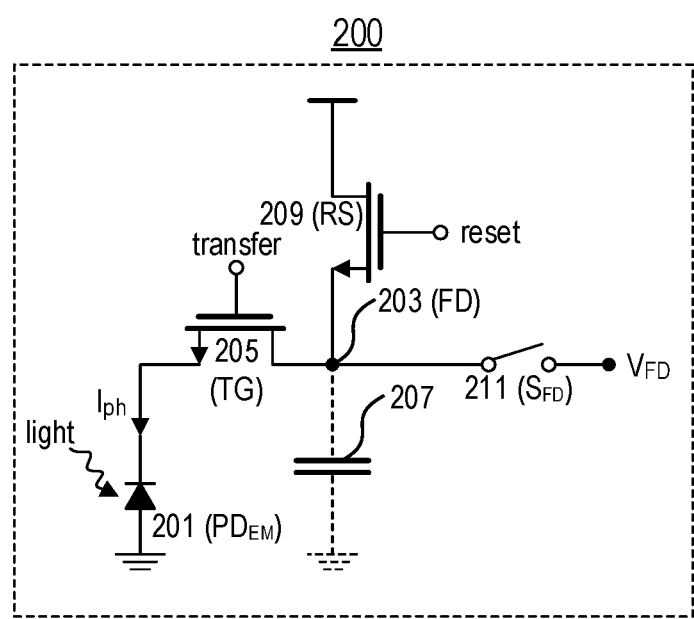
FIG. 2A is a schematic representation of an exemplary exposure measurement sub-circuit according to embodiments of the present disclosure.

FIG. 2A is a schematic representation of an exposure measurement sub-pixel 200 for use in a super-pixel (e.g., the super-pixel 100 of FIG. 1A or any of the other super-pixels of FIGS. 1B-D). As shown in FIG. 2A, the sub-pixel 200 may include a photosensitive element 201 ($PD_{EM}$) generating a signal (e.g., $I_{ph}$) proportional to light impinging on the element 201. The signal may be integrated onto node 203 (FD). For example, the signal may be integrated for a pre-determined time onto parasitic capacitance of a node of element 201 (e.g., the cathode of photodiode node $PD_{EM}$). The integrated charge may be transferred from the parasitic capacitance of element 201 to node 203 (FD) through transistor 205 (TG). The gate of transistor 205 (TG) may be controlled by a signal labeled "transfer" in FIG. 2A. Accordingly, transistor 205 (TG) generates voltage output signal $V_{FD}$ by transferring the integrated signal to node 203 (FD). As depicted in FIG. 2A, node 203 may have a capacitance due to a capacitor 207 and/or a parasitic capacitance at the node. A second transistor 209 (RS) may reset node 203 for new measurements, e.g., after the signal $V_{FD}$ is transferred to the ADC (not shown) through a switch 211 (and/or one or more transistors configured to act as a switch) $S_{FD}$. The gate of transistor 211 (RS) may be controlled by a signal labeled "reset" in FIG. 2A.

Figure 2B:
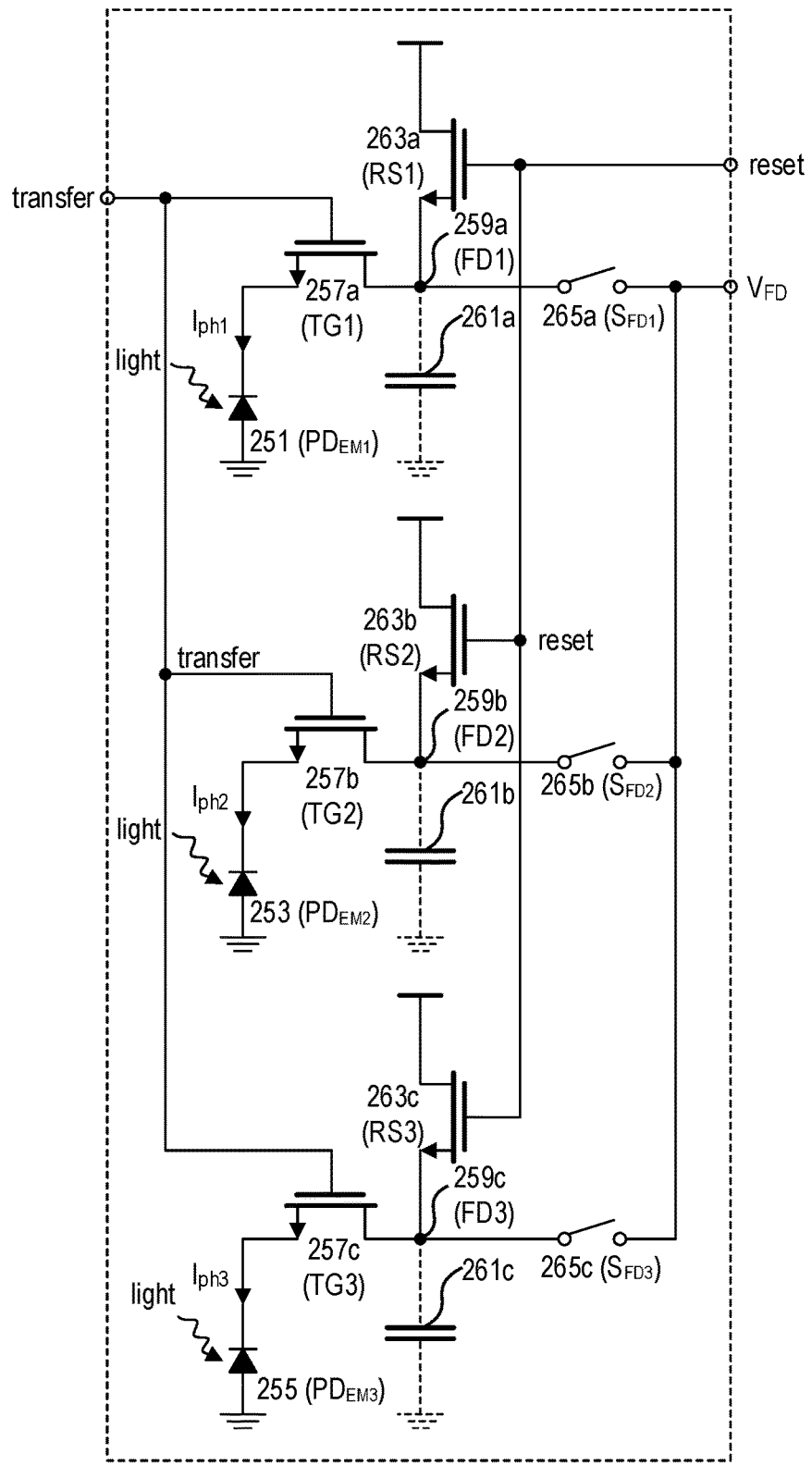
FIG. 2B is a schematic representation of three exposure measurement sub-circuits having separate nodes for simultaneous exposure, according to embodiments of the present disclosure.

FIG. 2B is a schematic representation of a system 250 including three exposure measurement sub-pixels having separate sense nodes and having shared transfer and reset signals, allowing for simultaneous exposure (i.e., a common start and end of integration). The different sense nodes may be configured to have different capacitances, allowing for different charge-to-voltage conversion gains. This can be beneficial for high-dynamic-range operations, for example. System 250 may be for use in a super-pixel (e.g., the super-pixel 100" of FIG. 1C). As shown in FIG. 2B, each photosensitive element (e.g., element 251 ($PD_{EM1}$), element 253 ($PD_{EM2}$), and element 255 ($PD_{EM3}$)) may have its corresponding signal (e.g., $I_{ph1}$, $I_{ph2}$, and $I_{ph3}$, as shown in the example of FIG. 2B) integrated onto a different parasitic capacitance of a node of the respective elements (e.g., the cathodes of the corresponding photodiode node, e.g., $PD_{EM1}$, $PD_{EM2}$, and $PD_{EM3}$). Accordingly, transistors 257a, 257b, and 257c (TG1, TG2, and TG3, respectively) generate a voltage output signal $V_{FD}$ by transferring the integrated signals to nodes 259a, 259b, and 259c, respectively (FD1, FD2, and FD3, respectively). As depicted in FIG. 2B, node 259a may have a capacitance due to a capacitor 261a and/or a parasitic capacitance at the node; node 259b may have a capacitance due to a capacitor S261b and/or a parasitic capacitance at the node; and node 259c may have a capacitance due to a capacitor 261c and/or a parasitic capacitance at the node. Moreover, in the example of FIG. 2B, the transistors are all controlled by the same signal (labeled "transfer"). A second set of transistors 263a, 263b, and 263c (RS1, RS2, and RS3, respectively) may reset nodes 259a, 259b, and 259c, respectively, for new measurements, e.g., after the signal $V_{FD}$ is transferred to the ADC (not shown). The gates of transistors 263a, 263b, and 263c (RS1, RS2, and RS3, respectively) may be controlled by the same signal labeled "reset" in FIG. 2B Each node may be connected to different routing components, such as a switch (e.g., switch 265a ($S_{FD1}$), switch 265b ($S_{FD2}$), and switch 265c ($S_{FD3}$), respectively, and/or one or more transistors configured to act as a switches) to allow for simultaneous exposure and sequential transfer to the ADC (not shown).

Figure 2C:
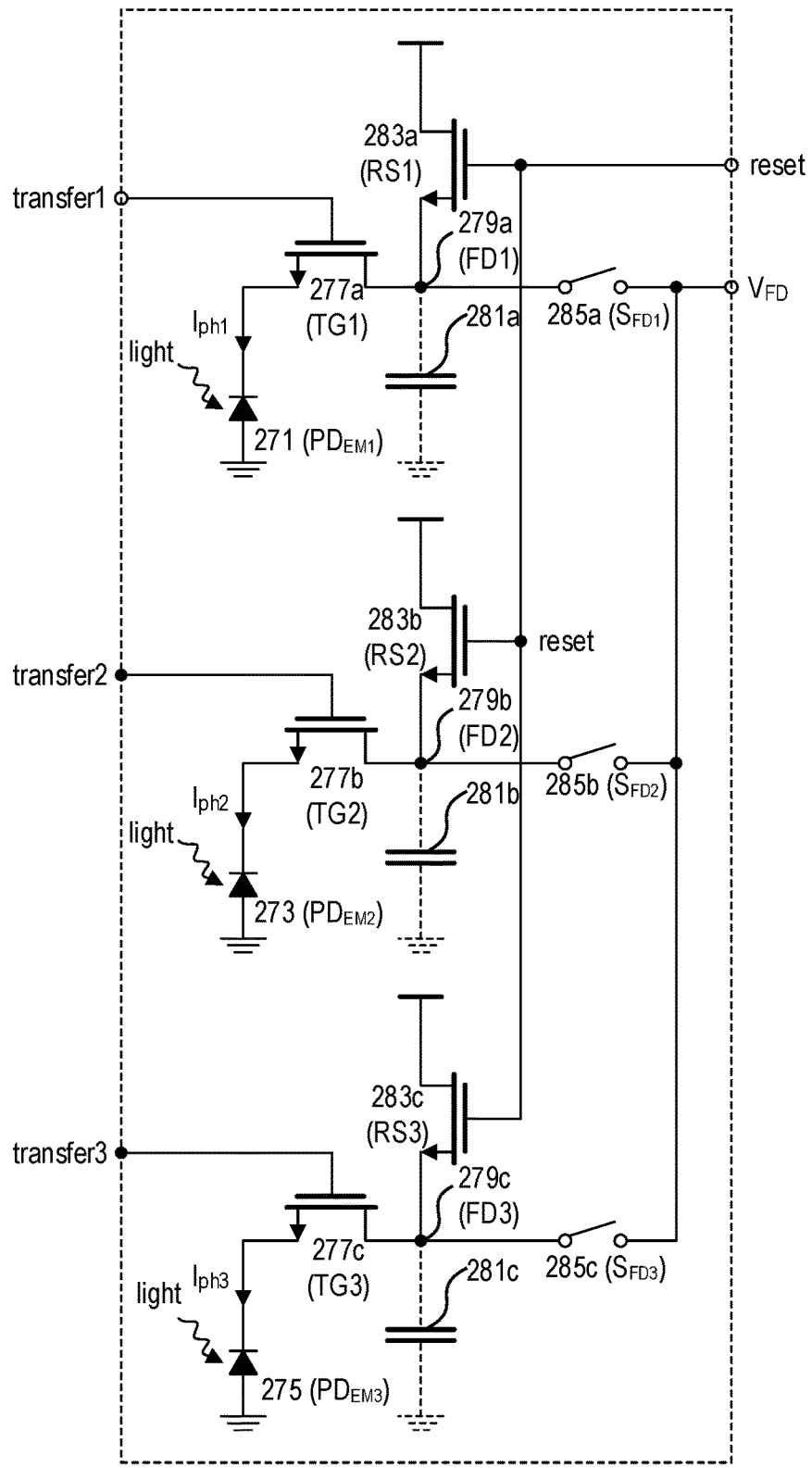
FIG. 2C is a schematic representation of three exposure measurement sub-circuits having separate nodes for separate exposures, according to embodiments of the present disclosure.

FIG. 2C is a schematic representation of a system 270 including three exposure measurement sub-pixels having separate sense nodes and having separate transfer signals, allowing for different exposure times (i.e., a common start but different end time for integration). The conversion gains of the different sense nodes may be configured to be the same such that high-dynamic-range may be obtained through different integration times. Alternatively, similar to system 250 of FIG. 2B, the conversion gains of the different sense nodes may be configured to be different. System 270 may be for use in a super-pixel (e.g., the super-pixel 100" of FIG. 1C). As shown in FIG. 2C, each photosensitive element (e.g., element 271 ($PD_{EM1}$), element 273 ($PD_{EM2}$), and element 275 ($PD_{EM3}$)) may have its corresponding signal (e.g., $I_{ph1}$, $I_{ph2}$, and $I_{ph3}$, as shown in the example of FIG. 2C) integrated onto a different parasitic capacitance of a node of the respective elements (e.g., the cathodes of the corresponding photodiode node, e.g., $PD_{EM1}$, $PD_{EM2}$, and $PD_{EM3}$). Accordingly, transistors 277a, 277b, and 277c (TG1, TG2, and TG3, respectively) generate a voltage output signal $V_{FD}$ by transferring the integrated signals to nodes 279a, 279b, and 279c, respectively (FD1, FD2, and FD3, respectively). As depicted in FIG. 2C, node 279a may have a capacitance due to a capacitor 281a and/or a parasitic capacitance at the node; node 279b may have a capacitance due to a capacitor 281b and/or a parasitic capacitance at the node; and node 279c may have a capacitance due to a capacitor 281c and/or a parasitic capacitance at the node. Moreover, in the example of FIG. 2C, each transistor is controlled by a corresponding signal (e.g., labeled "transfer1," "transfer2," and "transfer3"). A second set of transistors 283a, 283b, and 283c (RS1, RS2, and RS3, respectively) may reset nodes 279a, 279b, and 279c, respectively, for new measurements, e.g., after the signal $V_{FD}$ is transferred to the ADC (not shown). The gates of transistors 283a, 283b, and 283c (RS1, RS2, and RS3, respectively) may be controlled by a corresponding signal labeled "reset" in FIG. 2B. Each node may be connected to different routing components, such as a switch (e.g., switch 285a ($S_{FD1}$), switch 285b ($S_{FD2}$), and switch 285c ($S_{FD3}$), respectively, and/or one or more transistors configured to act as a switch) to allow for sequential transfer to the ADC (not shown).

Figure 2D:
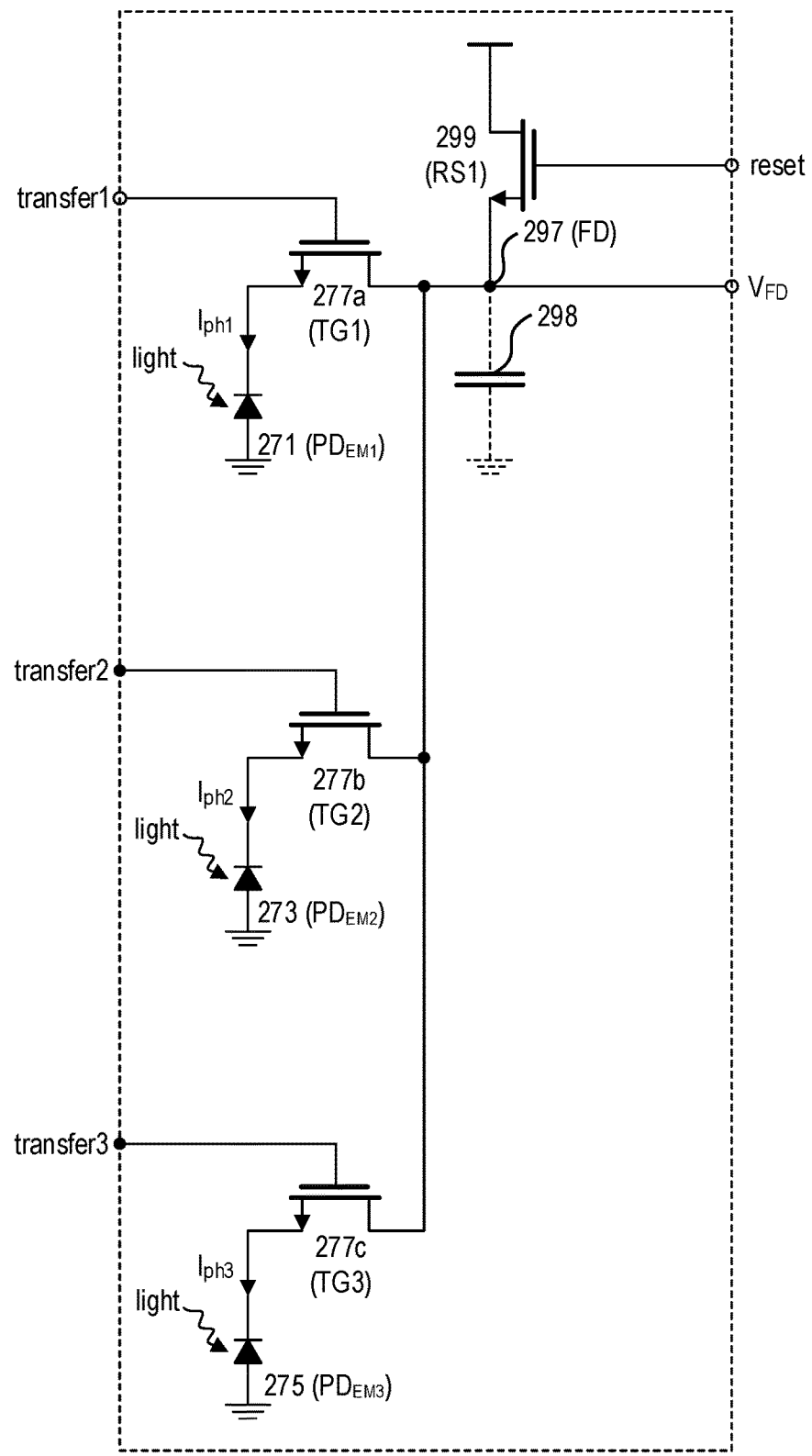
FIG. 2D is a schematic representation of three exposure measurement sub-circuits having sharing a node, according to embodiments of the present disclosure.

FIG. 2D is a schematic representation of a system 290 including three exposure measurement sub-pixels sharing the same sense node and having separate transfer signals, allowing for different exposure times (i.e., a common start time but different end time for integration). System 290 may be for use in a super-pixel (e.g., the super-pixel 100" of FIG. 1C). As shown in FIG. 2D, each photosensitive element (e.g., element 291 ($PD_{EM1}$), element 293 ($PD_{EM2}$), and element 295 ($PD_{EM3}$)) may have its corresponding signal (e.g., $I_{ph1}$, $I_{ph2}$, and $I_{ph3}$) integrated onto parasitic capacitance of a node of the respective elements (e.g., the cathodes of the corresponding photodiode node, e.g., $PD_{EM1}$, $PD_{EM2}$, and $PD_{EM3}$). Accordingly, transistors 277a, 277b, and 277c (TG1, TG2, and TG3, respectively) generate a voltage output signal $V_{FD}$ by sequentially transferring the integrated signals to node 297 (FD). As depicted in FIG. 2D, node 297 may have a capacitance due to a capacitor 298 and/or a parasitic capacitance at the node. Moreover, in the example of FIG. 2D, each transistor is controlled by a corresponding signal (e.g., labeled "transfer1," "transfer2," and "transfer3"). A second transistor 299 (RS1) may reset node 297 for new measurements, e.g., after the integrated signals are sequentially transferred to the ADC (not shown). The gate of transistor 299 (RS1) may be controlled by a corresponding signal labeled "reset" in FIG. 2D.

Figure 2E:
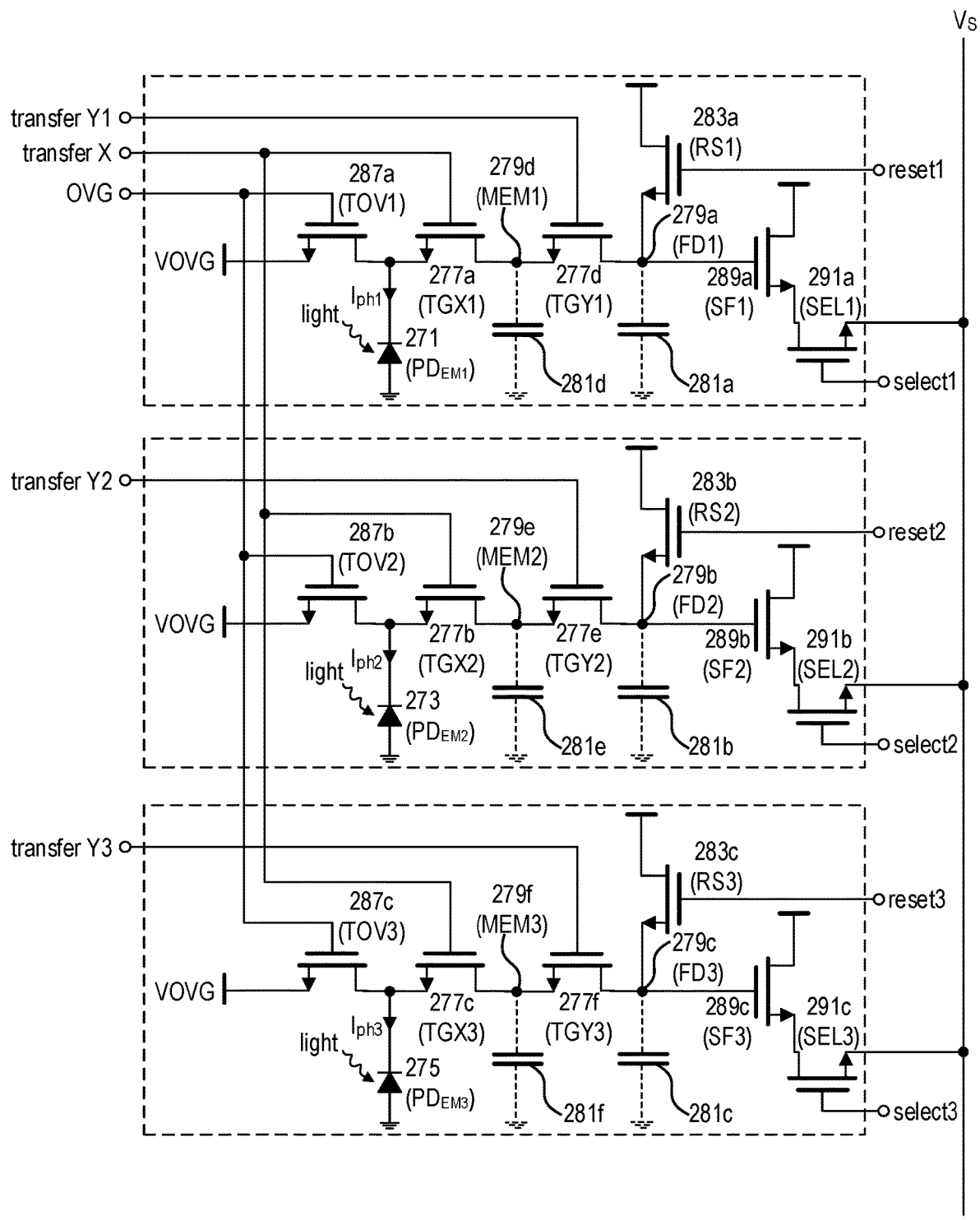
FIG. 2E is a schematic representation of three exposure measurement sub-circuits sharing a column-level analog-to-digital converter, according to embodiments of the present disclosure.

FIG. 2E is a schematic representation of a system 270' including three exposure measurement sub-pixels having separate sense nodes and having separate transfer signals, allowing for different exposure times (that is, a common start but different end time for integration). System 270' may be for use with column-level ADC and external latch operation. The readout trigger is still governed by the super-pixel's condition detector.

Accordingly, in FIG. 2E, the conversion gains of the different sense nodes may be configured to be the same such that a high-dynamic-range may be obtained through different integration times. Alternatively, similar to system 250 of FIG. 2B, the conversion gains of the different sense nodes may be configured to be different. System 270' may be for use in a super-pixel of the present disclosure (e.g., super-pixel 100" of FIG. 1C). Further still, system 270' may be for use in a super pixel with a condition detector that outputs trigger signals but does not control the exposure measurement circuits, which are instead controlled by an external readout trigger (e.g. realizing a standard frame mode reading out the full pixel array).

As shown in FIG. 2E, each photosensitive element (e.g., element 271 ($PD_{EM1}$), element 273 ($PD_{EM2}$), and element 275 ($PD_{EM3}$)) may have its corresponding signal (e.g., $I_{ph1}$, $I_{ph2}$, and $I_{ph3}$) integrated onto a different parasitic capacitance of a node of the respective elements (e.g., the cathodes of the corresponding photodiode node, e.g., $PD_{EM1}$, $PD_{EM2}$, and $PD_{EM3}$). Accordingly, transistors 277a, 277b, and 277c (TGX1, TGX2, and TGX3, respectively) generate a voltage output signal $V_{FD}$ by transferring the integrated signals to nodes 279d, 279e, and 279f, respectively (MEM1, MEM2, and MEM3, respectively). As depicted in FIG. 2E, node 279d may have a capacitance due to a capacitor 281d and/or a parasitic capacitance at the node; node 279e may have a capacitance due to a capacitor 281e and/or a parasitic capacitance at the node; and node 279f may have a capacitance due to a capacitor 281f and/or a parasitic capacitance at the node. Moreover, in the example of FIG. 2E, each transistor is controlled by a signal from the global shutter (e.g., labeled "transfer X" in the example of FIG. 2E). For example, a global periodic external signal may activate signal "transfer X" when selecting a row comprising system 270'. Accordingly, this charge transfer may occur over a first fixed clock cycle.

At a second fixed cycle, as shown in FIG. 2E, transistors 277d, 277e, and 277f (TGY1, TGY2, and TGY3, respectively) generate voltage output signal $V_{FD}$ by transferring the integrated signals to nodes 279a, 279b, and 279c, respectively (FD1, FD2, and FD3, respectively). As depicted in FIG. 2E, node 279a may have a capacitance due to a capacitor 281a and/or a parasitic capacitance at the node; node 279b may have a capacitance due to a capacitor 281b and/or a parasitic capacitance at the node; and node 279c may have a capacitance due to a capacitor 281c and/or a parasitic capacitance at the node. Moreover, in the example of FIG. 2E, each transistor is controlled by a second global periodic external signal (e.g., labeled "transfer Y1," "transfer Y2," and "transfer Y3," respectively).'.

A third set of transistors 287a, 287b, and 287c (TOV1, TOV2, and TOV3, respectively) may function as overflow gates to reset the photodiode and ensure that the transferred voltage $V_{FD}$ does not reverse signs before output.

A fourth set of transistors 289a, 289b, and 289c (SF1, SF2, and SF3, respectively), and 291a, 291b, and 291c (SEL1, SEL2, and SEL3, respectively) may control selection and readout from the exposure measurement circuits. For example, in embodiments where exposure measurements are triggered by a condition detector, transistors 291a, 291b, and 291c (SEL1, SEL2, and SEL3, respectively) may activate a measurement from exposure measurement circuit(s) in response to the trigger signal (labeled "select1," "select2," and "select3," respectively), corresponding to the condition detector. In response, transistors 289a, 289b, and 289c (SF1, SF2, and SF3, respectively) may function as source followers for nodes 279a, 279b, and 279c, respectively (FD1, FD2, and FD3, respectively). Additionally or alternatively, the external readout system (not shown) may select an exposure measurement circuit regardless of its corresponding condition detector, e.g., when the exposure measurement circuit has not triggered in a threshold number of clock cycles. In such embodiments, the condition detector may also activate an external latch such that the readout system may use the external latch to determine which exposure measurement circuits should be clocked (e.g., using corresponding row and column transfer signals). Alternatively, the readout system may clock all exposure measurement circuits and then use post-processing to throw out any measurements from exposure measurement circuits having corresponding external latches that are not enabled.

Finally, similar to system 270 of FIG. 2C, a set of transistors 283a, 283b, and 283c (RS1, RS2, and RS3, respectively) may reset nodes 279a, 279b, and 279c, respectively, for new measurements, e.g., after the signal V is transferred to the ADC (not shown). The gates of transistors 283a, 283b, and 283c (RS1, RS2, and RS3, respectively) may be controlled by corresponding signals labeled "reset1," "reset2," and "reset3," respectively, in FIG. 2E.

Figure 2F:
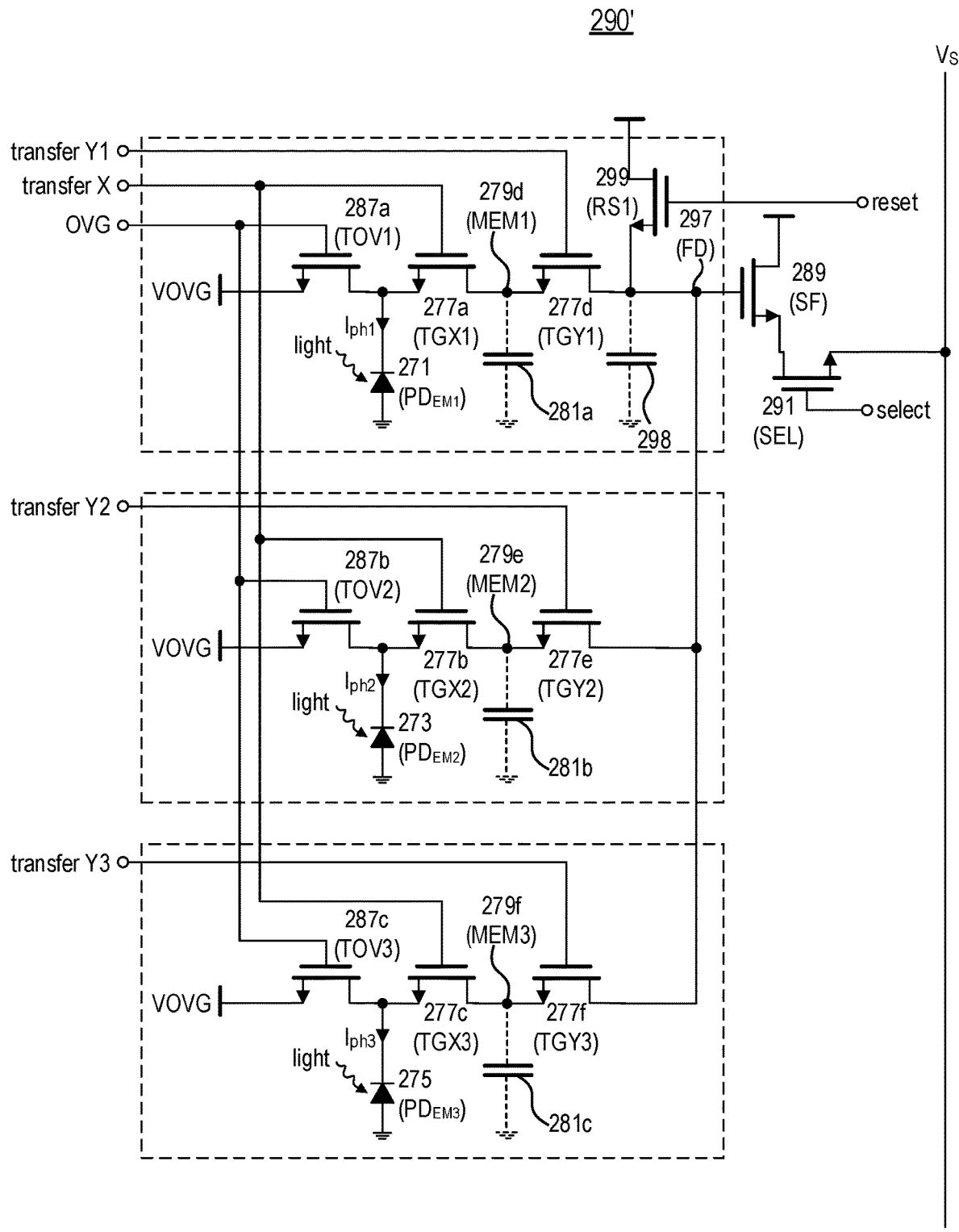
FIG. 2F is a schematic representation of three exposure measurement sub-circuits sharing a column-level analog-to-digital converter as well as a floating diffusion, a reset transistor, a source follower transistor, and a pixel select transistor, according to embodiments of the present disclosure.

FIG. 2F is a schematic representation of a system 290' including three exposure measurement sub-pixels sharing the same sense node and having separate transfer signals, allowing for different exposure times (i.e., a common start time but different end time for integration). System 290' may be for use with column-level ADC and external latch operation. The readout trigger is still governed by the super-pixel's condition detector.

Alternatively, system 290' may be for use in a super-pixel of the present disclosure (e.g., super-pixel 100" of FIG. 1C). Further still, system 290' may be for use in a super pixel with a condition detector that outputs trigger signals but does not control the exposure measurement circuits, which are instead controlled by an external readout trigger (e.g. realizing a standard frame mode reading out the full pixel array).

As shown in FIG. 2F, each photosensitive element (e.g., element 271 ($PD_{EM1}$), element 273 ($PD_{EM2}$), and element 275 ($PD_{EM3}$)) may have its corresponding signal (e.g., $I_{ph1}$, $I_{ph2}$, and $I_{ph3}$) integrated onto parasitic capacitance of a node of the respective elements (e.g., the cathodes of the corresponding photodiode node, e.g., $PD_{EM1}$, $PD_{EM2}$, and $PD_{EM3}$). Accordingly, transistors 277a, 277b, and 277c (TGX1, TGX2, and TGX3, respectively) generate a voltage output signal $V_{FD}$ by simultaneously transferring the integrated signals to nodes 279d, 279e, and 279f, respectively (MEM1, MEM2, and MEM3, respectively). As depicted in FIG. 2F, node 279d may have a capacitance due to a capacitor 281a and/or a parasitic capacitance at the node; node 279e may have a capacitance due to a capacitor 281b and/or a parasitic capacitance at the node; and node 279f may have a capacitance due to a capacitor 281c and/or a parasitic capacitance at the node. Moreover, in the example of FIG. 2F, each transistor is controlled by a signal from the global shutter (e.g., labeled "transfer X" in the example of FIG. 2F). For example, a global periodic external signal may activate signal "transfer X" when selecting a row comprising system 290'. Accordingly, this charge transfer may occur over a first fixed clock cycle.

At a second fixed cycle, as shown in FIG. 2F, transistors 277d, 277e, and 277f (TGY1, TGY2, and TGY3, respectively) generate voltage output signal $V_{FD}$ by transferring the integrated signals to node 297 (FD). As depicted in FIG. 2F, node 297 may have a capacitance due to a capacitor 298 and/or a parasitic capacitance at the node. Moreover, in the example of FIG. 2F, each transistor is controlled by second periodic external signals (e.g., labeled "transfer Y1," "transfer Y2," and "transfer Y3," respectively) triggering the three transfers sequentially.

A third set of transistors 287a, 287b, and 287c (TOV1, TOV2, and TOV3, respectively) may function as overflow gates to reset the photodiode and ensure that the transferred voltage $V_{FD}$ does not reverse signs before output.

A fourth set of transistors 289 (SF) and 291 (SEL) may control selection and readout from the exposure measurement circuits. For example, in embodiments where exposure measurements are triggered by a condition detector, transistor 291 (SEL) may activate a measurement from the exposure measurement circuits in response to the trigger signal (labeled "select"), corresponding to the condition detector. In response, transistor 289 (SF) may function as a source follower for node 297 (FD). Additionally or alternatively, the external readout system (not shown) may select exposure measurement circuits regardless of its corresponding condition detector, e.g., when the exposure measurement circuits have not triggered in a threshold number of clock cycles. In such embodiments, the condition detector may also activate an external latch such that the readout system may use the external latch to determine which exposure measurement circuits should be clocked (e.g., using corresponding row and column transfer signals). Alternatively, the readout system may clock all exposure measurement circuits and then use post-processing to throw out any measurements from exposure measurement circuits having corresponding external latches that are not enabled.

A second transistor 299 (RS1) may reset node 297 (FD) for new measurements, e.g., after the integrated signals are sequentially transferred to the ADC (not shown). The gate of transistor 299 (RS1) may be controlled by a corresponding signal labeled "reset" in FIG. 2F.

Figure 2G:
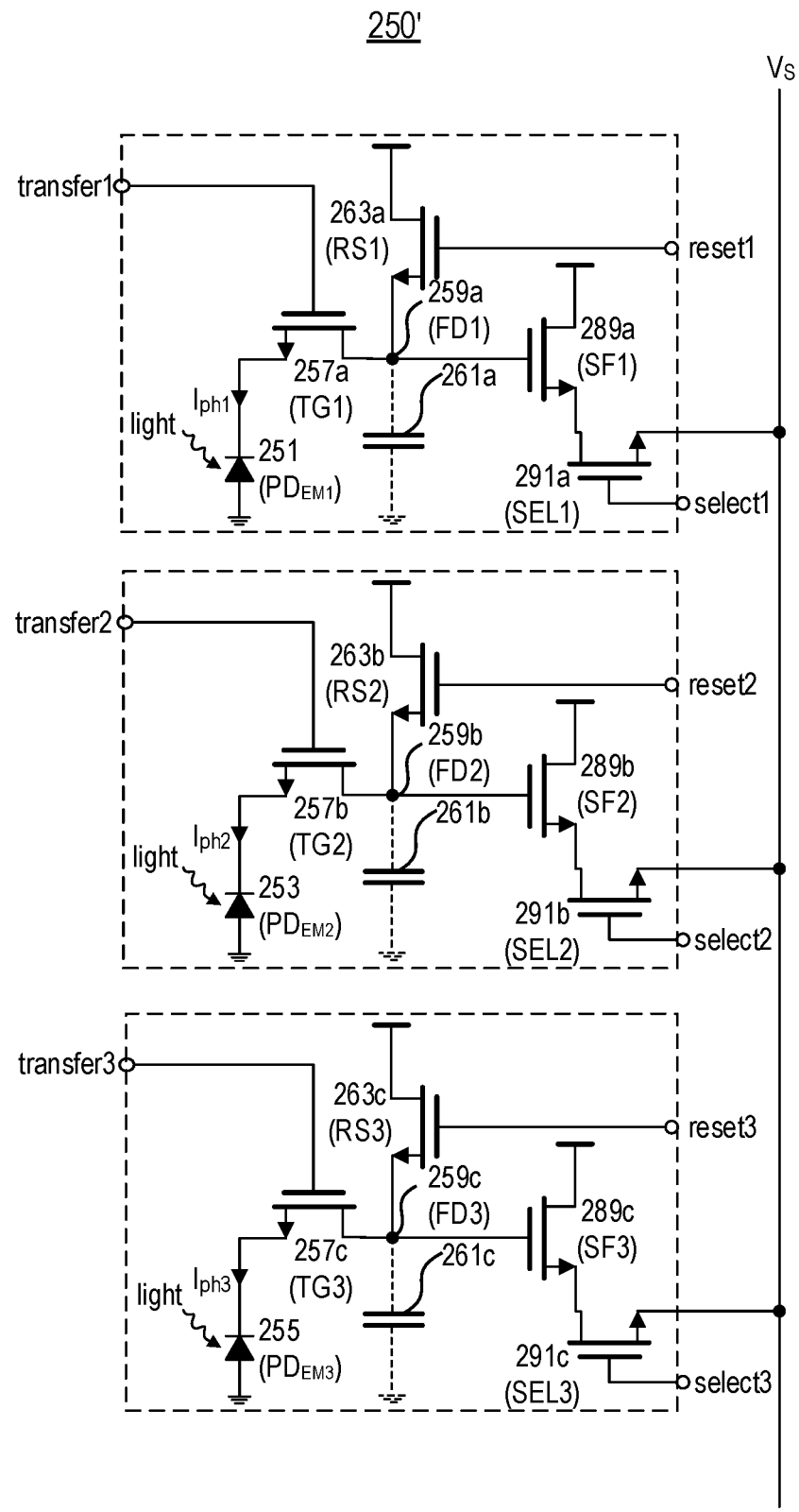
FIG. 2G is a schematic representation of three exposure measurement sub-circuits sharing a column-level analog-to-digital converter and working in rolling shutter mode, according to embodiments of the present disclosure.

FIG. 2G is a schematic representation of a system 250' including three exposure measurement sub-pixels having separate sense nodes and having separate transfer signals. The different sense nodes may be configured to have different capacitances, allowing for different charge-to-voltage conversion gains. Such an arrangement may be beneficial for high-dynamic-range operations. System 250' may be for use with column-level ADC and external latch operation. The readout trigger is still governed by the super-pixel's condition detector.

System 250' may be for use in a super-pixel of the present disclosure (e.g., super-pixel 100" of FIG. 1C). Further still, system 250' may be for use in a super pixel with a condition detector that outputs trigger signals but does not control the exposure measurement circuits, which are instead controlled by an external readout trigger (e.g. realizing a standard frame mode reading out the full pixel array).

As shown in FIG. 2G, each photosensitive element (e.g., element 251 ($PD_{EM1}$), element 253 ($PD_{EM2}$), and element 255 ($PD_{EM3}$)) may have its corresponding signal (e.g., $I_{ph1}$, $I_{ph2}$, and $I_{ph3}$) integrated onto a different parasitic capacitance of a node of the respective elements (e.g., the cathodes of the corresponding photodiode node, e.g., $PD_{EM1}$, $PD_{EM2}$, and $PD_{EM3}$). Accordingly, transistors 257a, 257b, and 257c (TG1, TG2, and TG3, respectively) generate a voltage output signal $V_{FD}$ by transferring the integrated signals to nodes 259a, 259b, and 259c, respectively (FD1, FD2, and FD3, respectively). As depicted in FIG. 2G, node 259a may have a capacitance due to a capacitor 261a and/or a parasitic capacitance at the node; node 259b may have a capacitance due to a capacitor 261b and/or a parasitic capacitance at the node; and node 259c may have a capacitance due to a capacitor 261c and/or a parasitic capacitance at the node. Transfers are controlled by first periodic external signals after resets of sense nodes.

A second set of transistors 263a, 263b, and 263c (RS1, RS2, and RS3, respectively) may reset nodes 259a, 259b, and 259c, respectively, before new readout, e.g., before the signal $V_{FD}$ is transferred to the ADC (not shown) and before a new measurement. The gates of transistors 263a, 263b, and 263c (RS1, RS2, and RS3, respectively) may be controlled by second periodic external signals labeled "reset1," "reset2," and "reset3," respectively, in FIG. 2G.

A third set of transistors 289a, 289b, and 289c (SF1, SF2, and SF3, respectively), and 291a, 291b, and 291c (SEL1, SEL2, and SEL3, respectively) may control selection and readout from the exposure measurement circuits. For example, in embodiments where exposure measurements are triggered by a condition detector, transistors 291a, 291b, and 291c (SEL1, SEL2, and SEL3, respectively) may activate a measurement from exposure measurement circuit(s) in response to the trigger signal (labeled "select1," "select2," and "select3," respectively), corresponding to the condition detector. In response, transistors 289a, 289b, and 289c (SF1, SF2, and SF3, respectively) may function as source followers for nodes 279a, 279b, and 279c, respectively (FD1, FD2, and FD3, respectively). Additionally or alternatively, the external readout system may select an exposure measurement circuit regardless of its corresponding condition detector, e.g., when the exposure measurement circuit has not triggered in a threshold number of clock cycles. In such embodiments, the condition detector may also activate an external latch such that the readout system may use the external latch to determine which exposure measurement circuits should be clocked (e.g., using corresponding row and column transfer signals). Alternatively, the readout system may clock all exposure measurement circuits and then use post-processing to throw out any measurements from exposure measurement circuits having corresponding external latches that are not enabled.

Figure 2H:
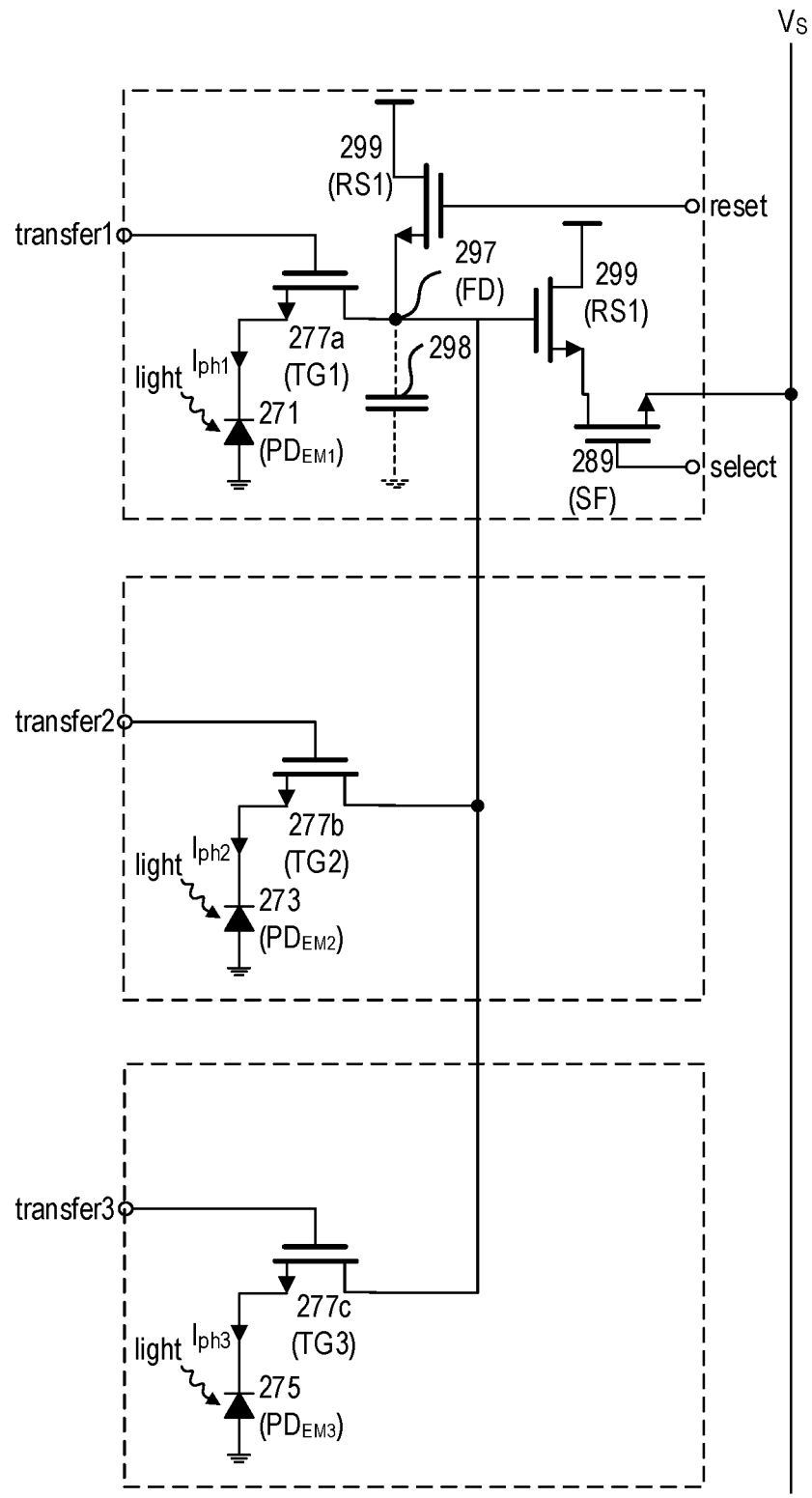
FIG. 2H is a schematic representation of three exposure measurement sub-circuits sharing a column-level analog-to-digital converter and working in rolling shutter mode, as well as a floating diffusion, a reset transistor, a source follower transistor, and a pixel select transistor, according to embodiments of the present disclosure.

FIG. 2H is a schematic representation of a system 290" including three exposure measurement sub-pixels sharing the same sense node and having separate transfer signals, allowing for different exposure times (i.e., a common start time but different end time for integration).

System 290" may be for use with column-level ADC and external latch operation. The readout trigger is still governed by the super-pixel's condition detector. Alternatively, system 290" may be for use in a super-pixel of the present disclosure (e.g., super-pixel 100" of FIG. 1C). Further still, system 290" may be for use in a super pixel with a condition detector that outputs trigger signals but does not control the exposure measurement circuits, which are instead controlled by an external readout trigger (e.g. realizing a standard frame mode reading out the full pixel array).

As shown in FIG. 2H, each photosensitive element (e.g., element 271 ($PD_{EM1}$), element 273 ($PD_{EM2}$), and element 275 ($PD_{EM3}$)) may have its corresponding signal (e.g., $I_{ph1}$, $I_{ph2}$, and $I_{ph3}$) integrated onto parasitic capacitance of a node of the respective elements (e.g., the cathodes of the corresponding photodiode node, e.g., $PD_{EM1}$, $PD_{EM2}$, and $PD_{EM3}$). Accordingly, transistors 277a, 277b, and 277c (TG1, TG2, and TG3, respectively) generate voltage output signal $V_{FD}$ by sequentially transferring the integrated signals to node 297 (FD). As depicted in FIG. 2H, node 297 may have a capacitance due to a capacitor 298 and/or a parasitic capacitance at the node. Moreover, in the example of FIG. 2H, the transistors are controlled by first periodic external signals (e.g., via signals labeled "transfer1," "transfer2," and "transfer3," respectively). A second transistor 299 (RS1) may reset node 297 for new measurements, e.g., before the signal $V_{FD}$ is transferred to the ADC (not shown) and before a new measurement. The gate of transistor 299 (RS1) may be controlled by a second periodic external signal labeled "reset" in FIG. 2H.

Although depicted using three exposure measurement sub-pixels, the structures depicted in FIGS. 2B-2H may be implemented for any number of exposure measurement sub-pixels. For example, two exposure measurement sub-pixels may be used or more than three exposure measurement sub-pixels may be used.

Figure 3A:
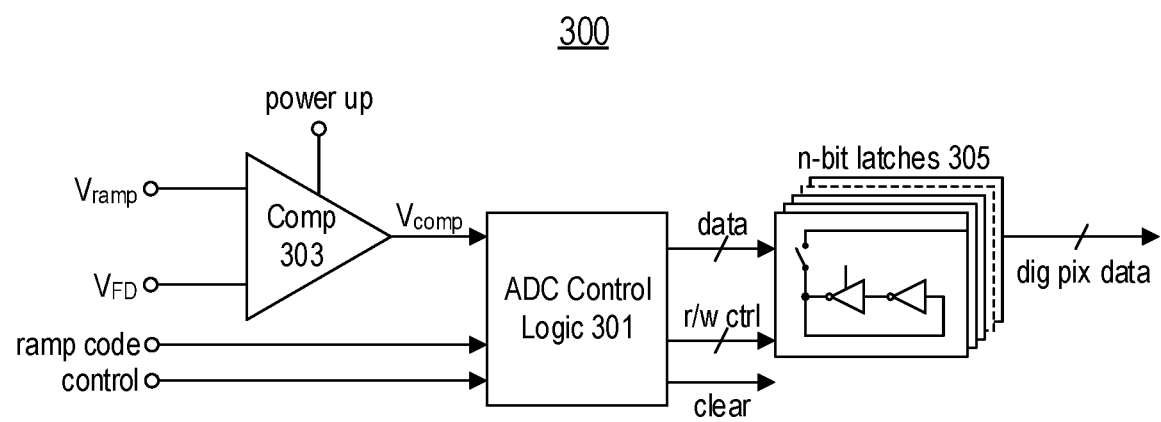
FIG. 3A is a schematic representation of an exemplary analog-to-digital converter, according to embodiments of the present disclosure.

FIG. 3A is a schematic representation of an analog-to-digital converter 300 for use in a super-pixel (e.g., the super-pixel 100 of FIG. 1A, or any of the other super-pixels of FIGS. 1B-1D). As shown in FIG. 3A the ADC 300 may comprise an n-bit ramp analog-to-digital converter. The ADC may therefore be a digital ramp analog-to-digital converter, such as a single-slope ramp or multi-slope ramp type of analog-to-digital converter. One of ordinary skill would understand that other ADCs may be used in super-pixels consistent with the present disclosure.

As further shown in FIG. 3A, the control logic of the control circuit of the super-pixel controls the ADC such that digital data is output from the ADC only when the ADC is enabled. Moreover, the enable (or "power up") caused by the condition detector of the super-pixel may cause the ADC 300 to activate, e.g., by supplying power to comparator 303 of ADC 300. Externally, the ramp voltage ($V_{ramp}$) may be fed to comparator 303 of ADC 300 from an external control circuit along with the output signal ($V_{FD}$) from the exposure measurement sub-pixel of the super-pixel. The ramp code (e.g., controlling the timing between ramp increases) may also be fed externally to control the ADC. Other ramp controls (labeled "control") may also be input externally to the ADC. Accordingly, a number of latches 305 (determined by the number of bits) are set using data from comparator 303 and read-write controls based on the ramp code. The contents of latches 305 may be read out (e.g., by an external readout system (not shown)), and ADC control logic 301 may send a "clear" signal to the control logic of the control circuit of the super-pixel (not shown).

Figure 3B:
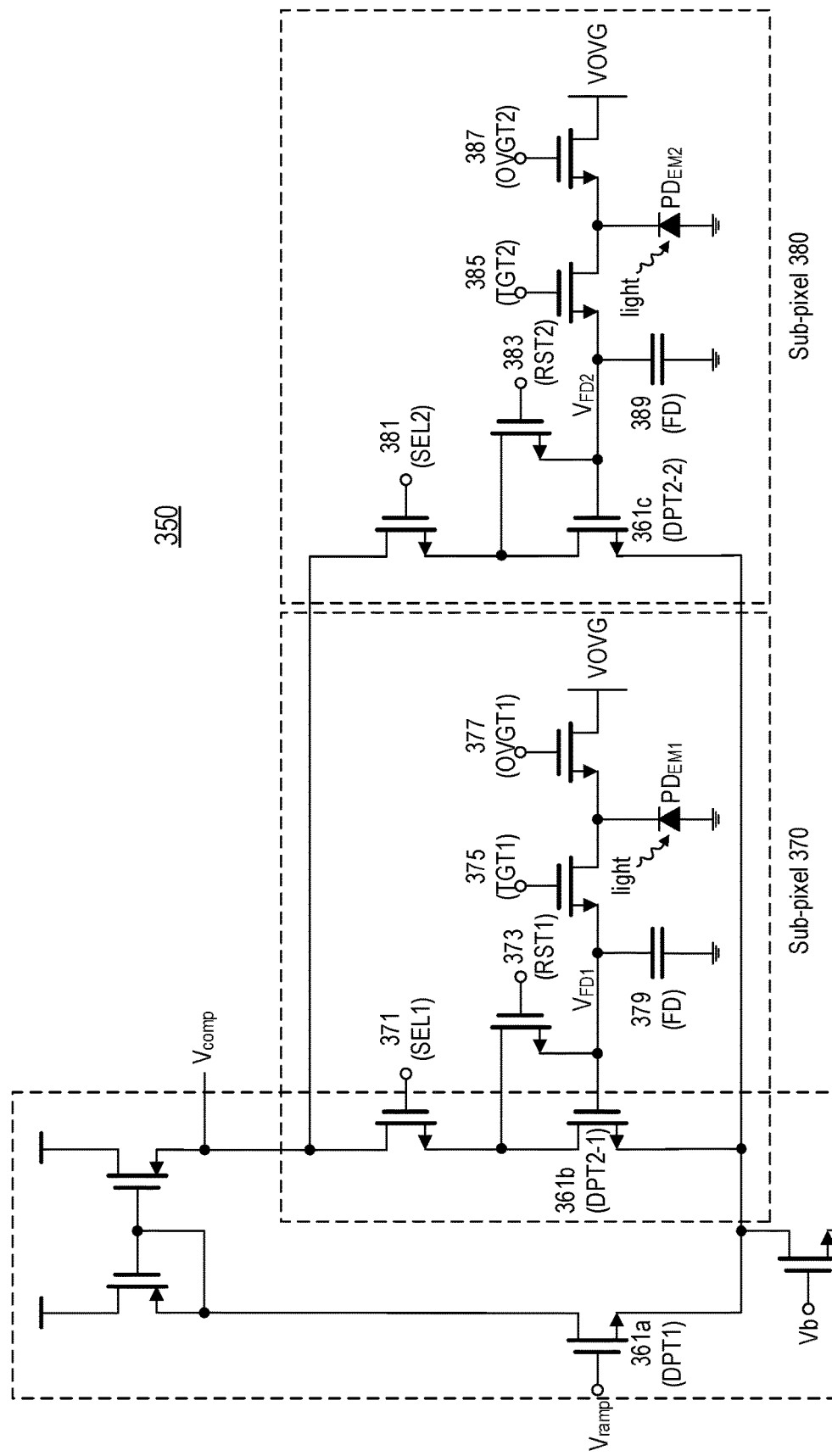
FIG. 3B is a schematic representation of an exemplary voltage comparator being part of an exemplary analog-to-digital converter sharing at least one transistor with exposure measurement sub-circuits, according to embodiments of the present disclosure.

FIG. 3B depicts an alternative analog-to-digital converter 350 for use in a super-pixel (e.g., the super-pixel 100" of FIG. 1C). In the example of FIG. 3B, a comparator 360 of FIG. 3B may comprise a pair of transistors such that a first transistor 361a cooperates with at least one second transistor of a plurality of sub-pixels (e.g., second transistor 361b of sub-pixel 370, second transistor 361c of sub-pixel 380, or the like).

The plurality of sub-pixels of FIG. 3B may be configured similar to any of the examples described above in FIGS. 2A-2H. In the example of FIG. 3B, sub-pixel 370 includes a photosensitive element $PD_{EM1}$ generating a signal integrated onto node 379 (FD) through transistor 375 (TGT1). Moreover, a second transistor 373 (RST1) may reset node 379 (FD) for new measurements, e.g., after the signal is transferred to comparator 360 of the ADC. A third transistor 377 (OVGT1) may function as an overflow gate to ensure that the transferred voltage $V_{FD}$ does not reverse signs when used by comparator 360 of the ADC, and a fourth transistor 371 (SEL1) may control selection and readout from sub-pixel 370. Similar, in the example of FIG. 3B, sub-pixel 380 includes a photosensitive element $PD_{EM2}$ generating a signal integrated onto node 389 (FD) through transistor 385 (TGT2). Moreover, a second transistor 383 (RST2) may reset node 389 (FD) for new measurements, e.g., after the signal is transferred to comparator 360 of the ADC. A third transistor 387 (OVGT2) may function as an overflow gate to ensure that the transferred voltage $V_{FD}$ does not reverse signs when used by comparator 360 of the ADC, and a fourth transistor 381 (SEL2) may control selection and readout from sub-pixel 370.

Figure 4:
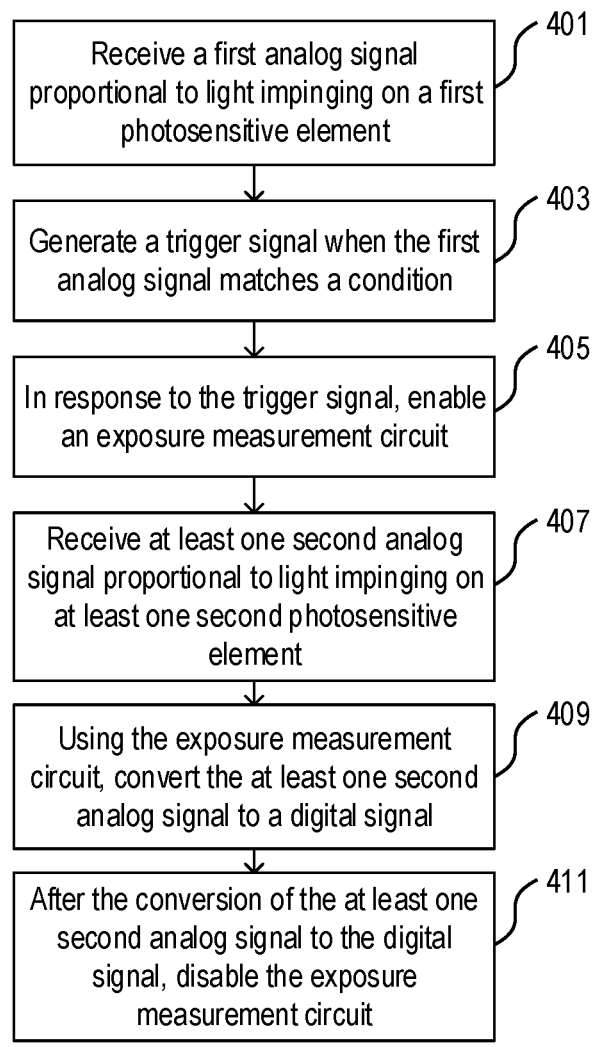
FIG. 4 is a flowchart of an exemplary method for controlling an image sensor having a plurality of super-pixels, according to embodiments of the present disclosure.

FIG. 4 is a flowchart of an exemplary method 400 for controlling an image sensor having a plurality of super-pixels, consistent with embodiments of the present disclosure. Method 400 of FIG. 4 may be performed using any super-pixel disclosed herein, such as super-pixel 100 of FIG. 1A or any of the other super-pixels of FIGS. 1B-1D.

At step 401, the super-pixel may receive a first analog signal proportional to light impinging on a first photosensitive element. For example, as explained above, photosensitive element 101 may generate the first analog signal (e.g., $I_{ph}$ or a voltage signal) proportional to light impinging thereon.

At step 403, the super-pixel may generate a trigger signal when the first analog signal matches a condition. For example, as explained above, condition detector 105 (CD) may generate the trigger signal (e.g., "set" in the above described examples) when the first analog signal exceeds a threshold. In some embodiments, the condition detector (CD) of the super-pixel may detect the condition asynchronously to a system clock.

At step 405, in response to the trigger signal, the super-pixel may enable an exposure measurement circuit. For example, as explained above, control logic 111 may enable the ADC 109 in response to the trigger signal ("set"). In some embodiments where the exposure measurement sub-pixel 107 (or exposure measurement sub-pixels 107a, 107b, 107c, or the like) is (are) not governed by the system clock (e.g., does (do) not receive periodic control signals such as "reset" and "transfer," as explained above with respect to the examples of FIG. 2), control logic 111 may also enable the exposure measurement sub-pixel 107 (or exposure measurement sub-pixels 107a, 107b, 107c, or the like) in response to the trigger signal ("set"). For example, control logic 111 may enable the exposure measurement sub-pixel 107 (or exposure measurement sub-pixels 107a, 107b, 107c, or the like) by enabling the sub-pixel to receive the periodic control signals and thus integrate signals from the photosensitive elements (as explained above with respect to the examples of FIG. 2).

At step 407, the super-pixel may receive at least one second analog signal proportional to light impinging on at least one second photosensitive element. For example, as explained above with respect to the examples of FIG. 1, photosensitive element 103 may generate the second analog signal (e.g., $I_{ph}$ or a voltage signal) proportional to light impinging thereon. As explained above with respect to step 405, in some embodiments, exposure measurement sub-pixel 107 (or exposure measurement sub-pixels 107a, 107b, 107c, or the like) may receive the second analog signal, but not integrate the same, until receiving the periodic control signals in response to the trigger signal from condition detector 105. In other embodiments, exposure measurement sub-pixel 107 (or exposure measurement sub-pixels 107a, 107b, 107c, or the like) may receive the periodic control signals according to the system clock and thus integrate the received second analog circuit in accordance with the same.

At step 409, using the exposure measurement circuit, the super-pixel may convert the at least one second analog signal to a digital signal. For example, as explained above with respect to the examples of FIG. 1, after the ADC 109 is enabled, the ADC 109 may covert the second analog signal (e.g., $V_{FD}$) from the exposure measurement sub-pixel 107 (or exposure measurement sub-pixels 107a, 107b, 107c, or the like) to digital data (e.g., "dig pix data") and output the same to the external readout system.

At step 411, after the conversion of the at least one second analog signal to the digital signal, the super-pixel may disable the exposure measurement circuit. For example, as explained above with respect to the examples of FIG. 1, the ADC 109 may generate a "clear" signal in response to the conversion and/or the output, which the control logic 111 may use to disable the ADC 109. Additionally or alternatively, ADC 109 may automatically stop responding to external control signals (such as $V_{ramp}$, the ramp code, or the like) after the conversion and/or the output.

Figure 5A:
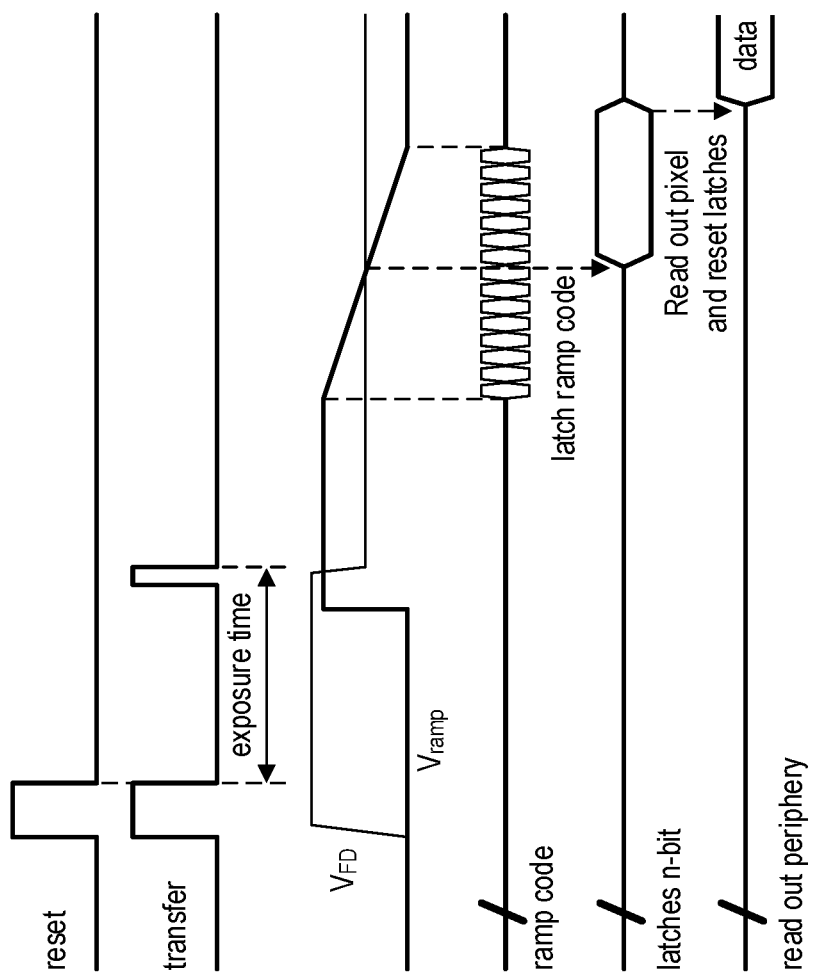
FIG. 5A is a graphical illustration of possible timings of the signals controlling the light intensity measurement, and the analog-to-digital conversion of the light intensity measurement result, in the exposure measurement sub-pixel and the super-pixel ADC in the case of a single exposure measurement sub-pixel as shown in FIG. 2A, according to embodiments of the present disclosure.

FIG. 5A is a diagram that illustrates the timing of signals controlling and generated by the super-pixel of FIG. 1A or 1B using the exposure measurement sub-pixel system of FIG. 2A. As depicted in FIG. 5A, a reset signal may be sent to the exposure measurement sub-pixel 107 by the external readout system, e.g., in accordance with a system clock. In addition, a transfer signal may be sent to the exposure measurement sub-pixel 107 by the external readout system, e.g., in accordance with the system clock. The exposure measurement sub-pixel 107 may therefore begin the integration of an analog signal from the photosensitive element 103 of the exposure measurement sub-pixel to the analog signal VF provided to the ADC 109. Additionally, although not depicted in FIG. 5A, a signal from condition detector 105 may be sent to the ADC, e.g., in response to detecting that an analog signal from the photosensitive element 101 of the condition detector 105 matches a condition. Accordingly, the ADC 109 may begin the conversion of VF to digital data, e.g., using a ramping procedure.

In embodiments using a ramp ADC, the ramp code may be provided to the ADC 109 from the external readout system. The corresponding latches of the ADC 109 may use the ramp code to convert analog signal VF into n-bit data (the number of bits determined by the architecture of the ADC 109). The ADC 109 may then output the data using read out periphery and reset the latches of the ADC 109 for another conversion. Although not shown in FIG. 5A, the ADC 109 may thereafter disable automatically after converting the analog signal/outputting the digital data.

Figure 5B:
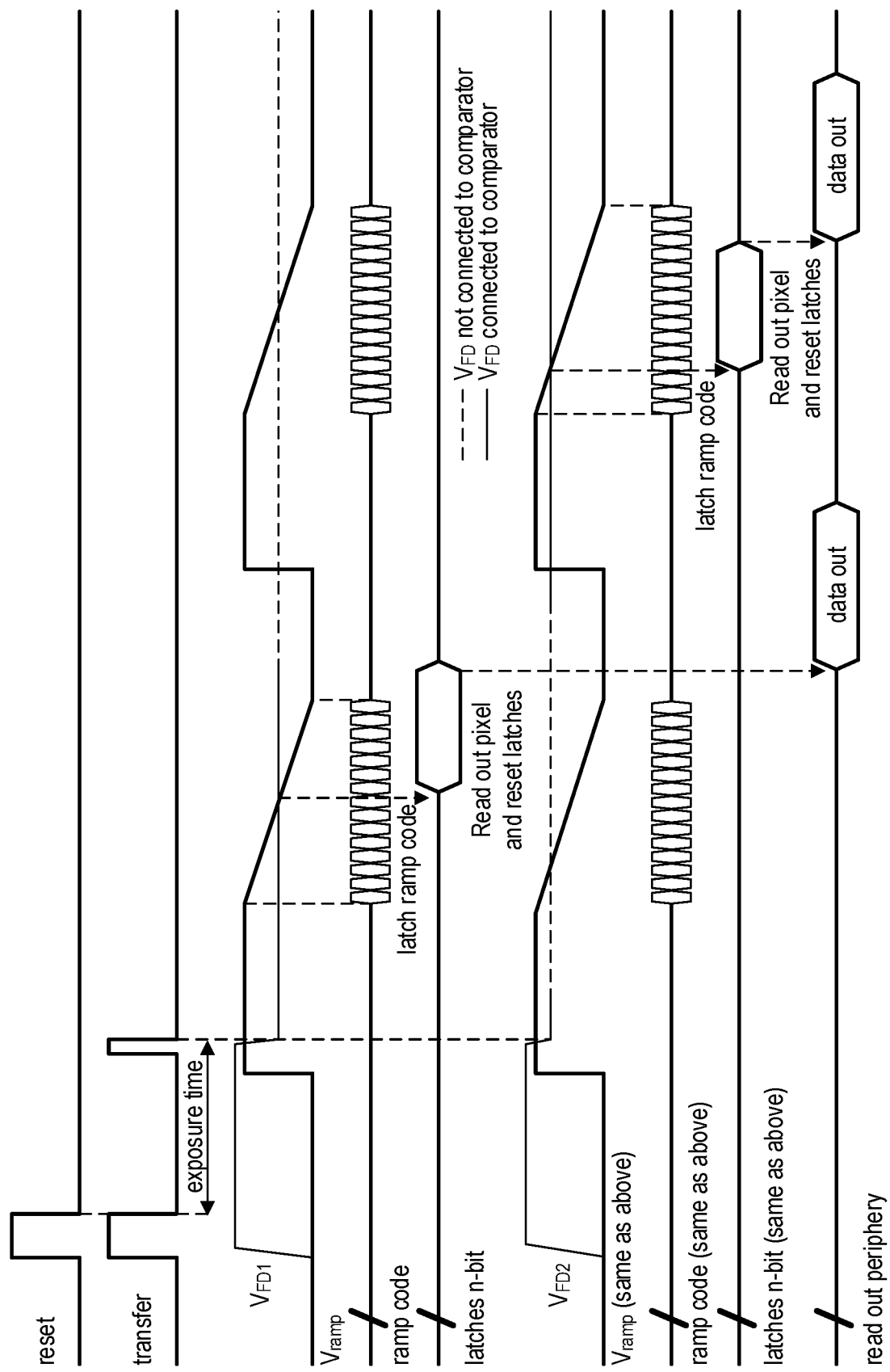
FIG. 5B is a graphical illustration of possible timings of the signals controlling the light intensity measurement, and the analog-to-digital conversion of the light intensity measurement result, in the exposure measurement sub-pixel and the super-pixel ADC in the case of two exposure measurement sub-pixels connected as shown in FIG. 2B (FIG. 2B shows three exposure measurement sub-pixels), according to embodiments of the present disclosure.

FIG. 5B is a diagram of the timing of signals controlling and generated by the super-pixel of FIG. 1C using the exposure measurement sub-pixel system of FIG. 2B. The signals of FIG. 5B are similar to those of FIG. 5A but include two analog signals $V_{FD1}$ and $V_{FD2}$ from two exposure measurement sub-pixels 107a and 107b paired to the single ADC 109. As shown in FIG. 5B, the integration is simultaneous, and the read outs are sequential. Accordingly, the sequential read outs include complementary measurements obtained over the same time. Therefore, the gain and/or color filter of the exposure measurement sub-pixels may differ in order to obtain complementary data.

Figure 5C:
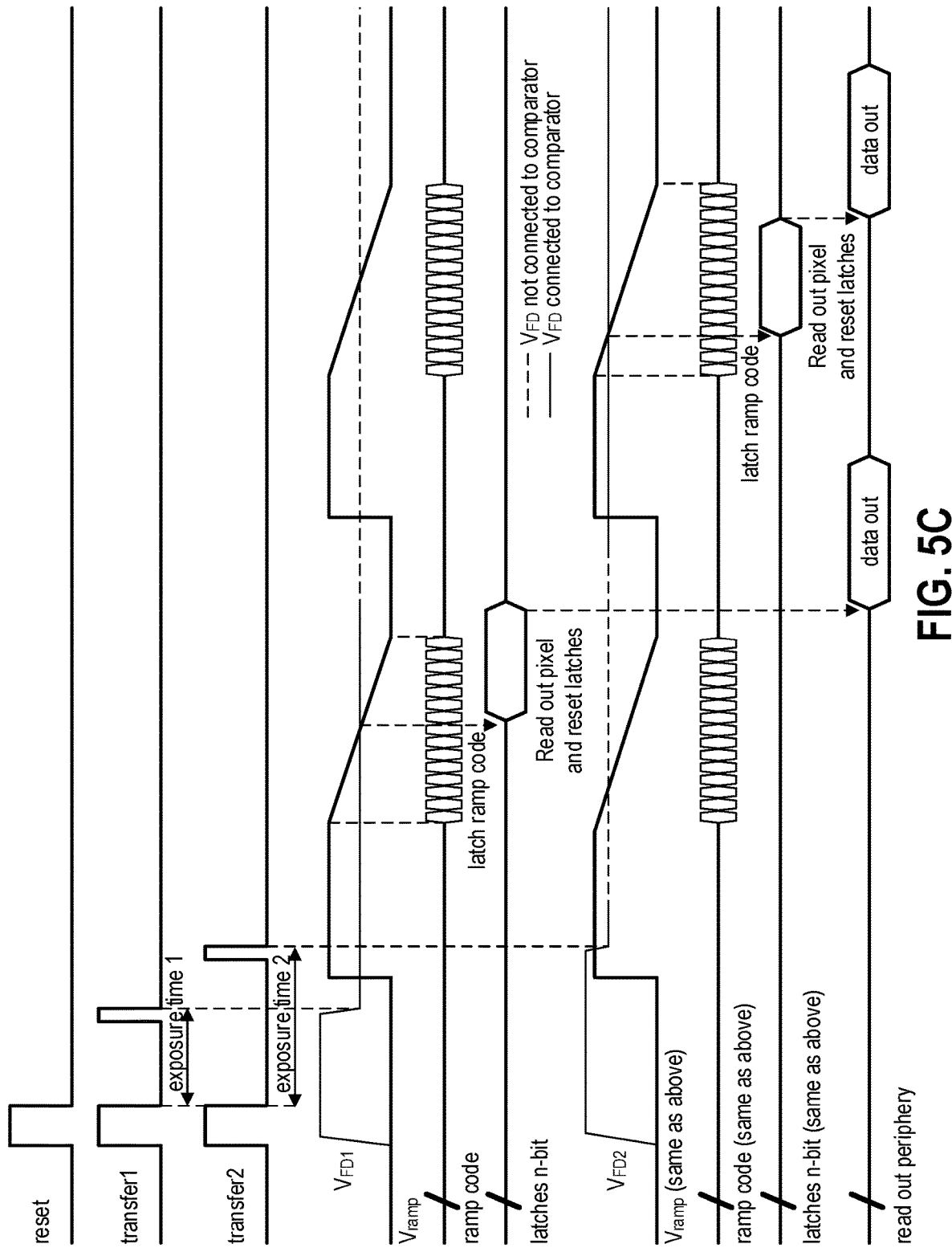
FIG. 5C is a graphical illustration of possible timings of the signals controlling the light intensity measurement, and the analog-to-digital conversion of the light intensity measurement result, in the exposure measurement sub-pixel and the super-pixel ADC in the case of two exposure measurement sub-pixels connected as shown in FIG. 2C (FIG. 2C shows three exposure measurement sub-pixels), according to embodiments of the present disclosure.

FIG. 5C is a diagram of the timing of signals controlling and generated by the super-pixel of FIG. 1C using the exposure measurement sub-pixel system of FIG. 2C. The signals of FIG. 5C are similar to those of FIG. 5A but include two analog signals $V_{FD1}$ and $V_{FD2}$ from two exposure measurement sub-pixels 107a and 107b paired to the single ADC 109. As shown in FIG. 5C, the integration is simultaneous but over different times (i.e., "exposure time 1" and "exposure time 2"). Accordingly, the sequential read outs include complementary measurements obtained over different times. Therefore, the complementary data may be used for high-dynamic range imaging.

Figure 5D:
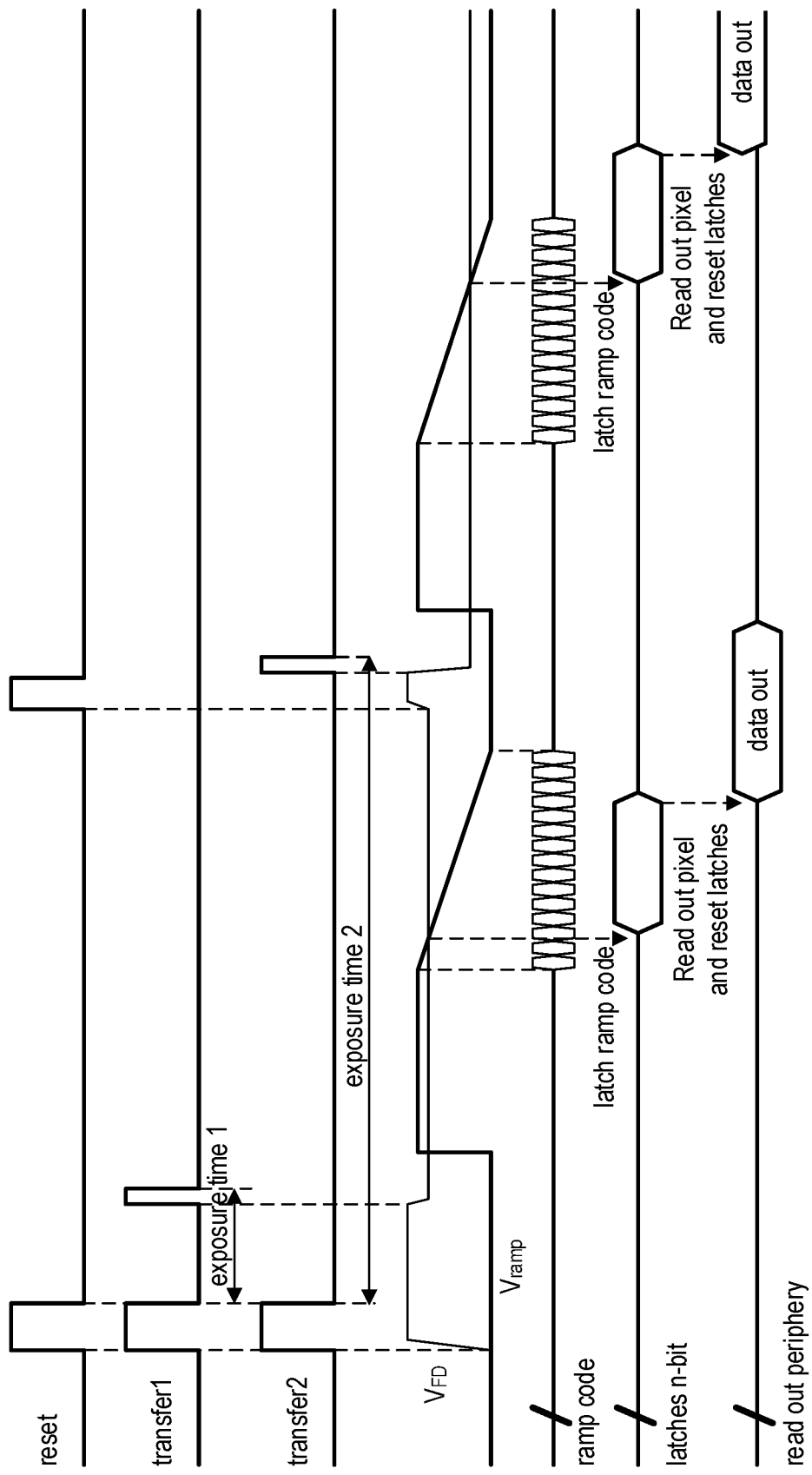
FIG. 5D is a graphical illustration of possible timings of the signals controlling the light intensity measurement, and the analog-to-digital conversion of the light intensity measurement result, in the exposure measurement sub-pixel and the super-pixel ADC in the case of two exposure measurement sub-pixels connected as shown in FIG. 2D (FIG. 2D shows three exposure measurement sub-pixels), according to embodiments of the present disclosure.

FIG. 5D is a diagram of the timing of signals controlling and generated by the super-pixel of FIG. 1C using the exposure measurement sub-pixel system of FIG. 2D. The signals of FIG. 5D are similar to those of FIG. 5A but the analog signal $V_{FD}$ is based on two exposure measurement sub-pixels 107a and 107b paired to the single ADC 109 and sequentially transferred to the same sense node. As shown in FIG. 5D, the integration is simultaneous but over different times (i.e., "exposure time 1" and "exposure time 2"). Accordingly, the sequential read outs include complementary but overlapping (in time) measurements obtained over different times. Therefore, the complementary data may be used for high-dynamic range imaging.

Figure 5E:
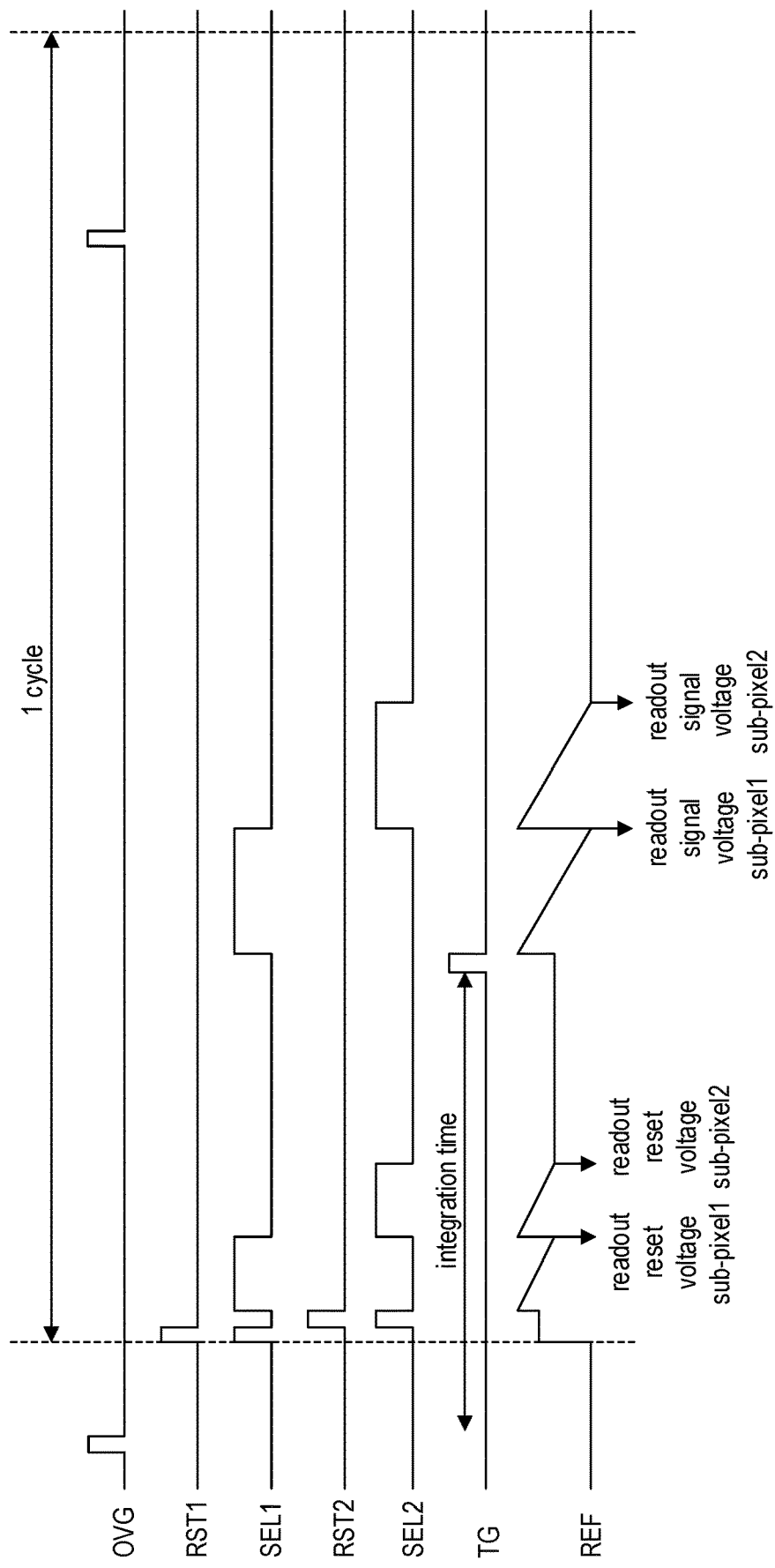
FIG. 5E is a graphical illustration of possible timings of the signals controlling the light intensity measurement, and the analog-to-digital conversion of the light intensity measurement result, in the exposure measurement sub-pixel and the super-pixel ADC in the case of comparator and exposure-measurement sub-pixels as shown in FIG. 3B, according to embodiments of the present disclosure.

FIG. 5E is a diagram of the timing of signals controlling and generated by a super pixel using the exposure measurement sub-pixel system of FIG. 3B. As depicted in FIG. 5E, a reset signal may be sent to the exposure measurement sub-pixels 370 and 380 by the external readout system, e.g., in accordance with a system clock. In addition, a transfer signal may be sent to the exposure measurement sub-pixels 370 and 380 by the external readout system, e.g., in accordance with the system clock. The exposure measurement sub-pixels 370 and 380 may therefore begin the integration of an analog signal from the photosensitive elements of the exposure measurement sub pixels to the analog signals provided to the comparator 360 of the ADC. Additionally, although not depicted in FIG. 5E, a signal from condition detector 105 may be sent to the ADC, e.g., in response to detecting that an analog signal from the photosensitive element of the condition detector 105 matches a condition. Accordingly, the ADC may begin the conversion of analog signals from sub-pixels 370 and 380 to digital data, e.g., using a ramping procedure.

As further depicted in FIG. 5E, during integration of the analog signals from sub-pixels 370 and 380, the reset voltages from the same may be output to the readout system. In some embodiments, the ADC may convert the reset voltages to digital signals before output. Thereafter, the analog signals proportional to light impinging on the photosensitive elements of sub-pixels 370 and 380 may be output. Accordingly, in the embodiment of FIG. 5E, one or more noise suppression and/or mismatch corrections may be performed using the output analog signals and reset voltages.

Figure 6A:
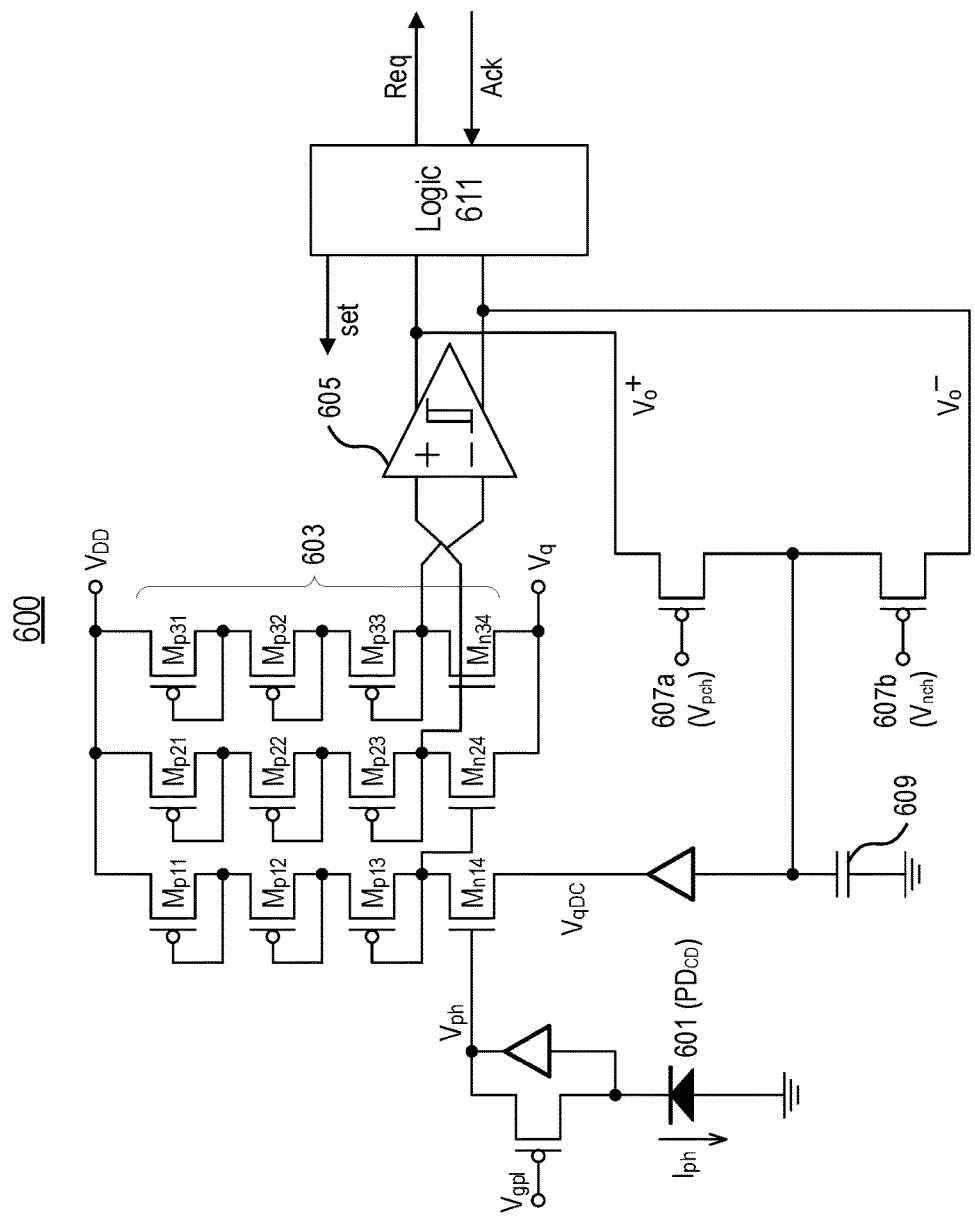
FIG. 6A is a schematic representation of an exemplary condition detector, according to embodiments of the present disclosure.

FIG. 6A is a schematic representation of an exemplary condition detector 600 for use in a super-pixel of the present disclosure, such as super-pixel 100 of FIG. 1A or any of the other super-pixels of FIGS. 1B-1D, or the like. As shown in FIG. 6A, an array of transistors 603 (e.g., $M_{p11}$, $M_{p12}$, $M_{p13}$, $M_{p14}$, $M_{p21}$, $M_{p22}$, $M_{p23}$, $M_{p24}$, $M_{p31}$, $M_{p32}$, $M_{p33}$, and $M_{p34}$) may amplify an analog signal $V_{ph}$ proportional to the output $I_{ph}$ of photosensitive element 601 ($PD_{CD}$) (e.g., $V_{ph}$ may be logarithmic with $I_{ph}$) and output amplified signal $V_{gp1}$. The array 603, in addition to the input terminal accepting $V_{ph}$ and the output terminal outputting $V_{gp1}$, may also have one or more control terminals, such as $V_{qDC}$. The control terminals may govern the amplification of $V_{ph}$, for example, by shifting an offset of the input (and/or the output). Additional terminals $V_q$ and VDD may control the level of amplification of array 603.

Condition detector 600 may further include a pair of comparators 605 with hysteresis. The pair of comparators 605 may output Vo$^+$ and Vo$^-$, which may activate current sources 607a (V$_{pch}$) and 607b (V$_{nch}$), respectively. Current sources 607a and 607b may produce currents of fixed value and may charge (or discharge) a capacitor 609. The voltage of capacitor 609 is fed, via a voltage follower, to array 603, e.g., via control terminal V$_{qDC}$. Accordingly, as light impinging on photosensitive element 601 increases, the current from source 607a increases and thus increases the offset of the amplifier formed by array 603. Accordingly, the input to the pair of comparators 605 will decrease until it reaches zero, and logic 611 will output the "set" signal. Similarly, as light impinging on photosensitive element 601 decreases, the current from source 607b increases and thus decreases the offset of the amplifier formed by array 603. Accordingly, the input to the pair of comparators 605 will increase until it reaches zero, and logic 611 will output the "set" signal. In some embodiments, logic 611 will also engage in a handshake (labeled "Req" and "Ack" with an external readout system).

Figure 6B:
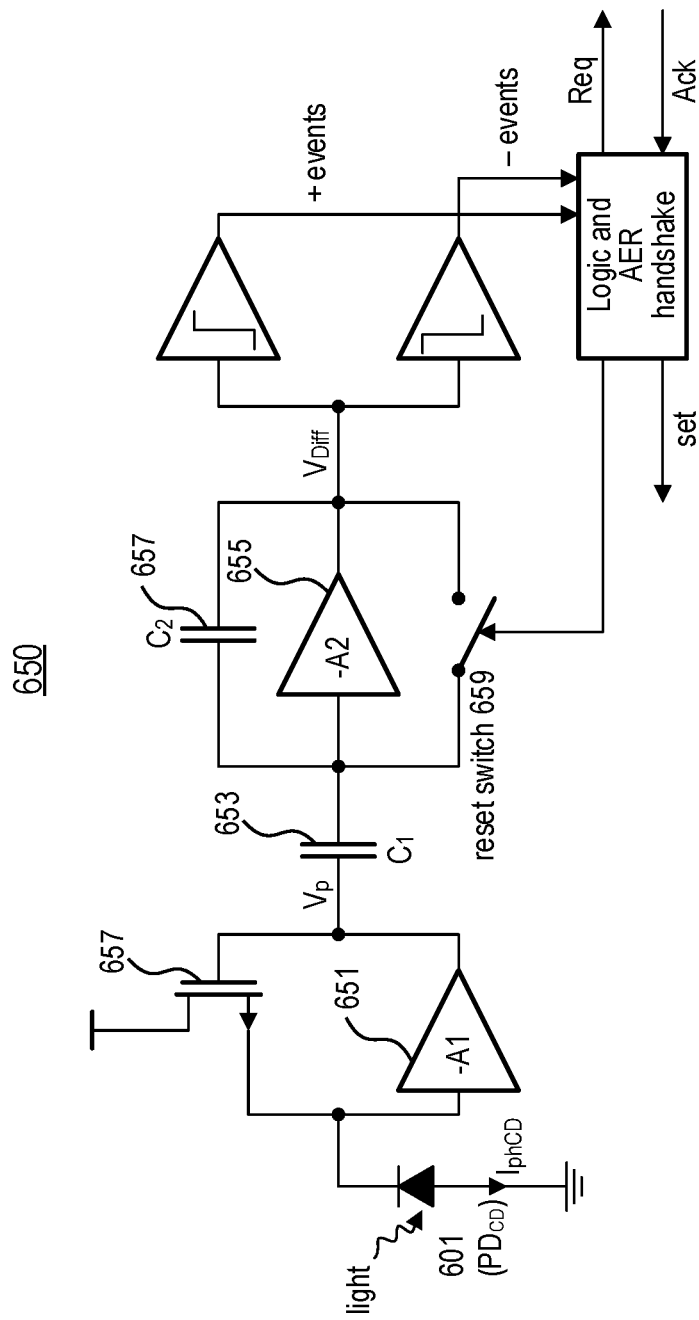
FIG. 6B is a schematic representation of another exemplary condition detector, according to embodiments of the present disclosure.

FIG. 6B is a schematic representation of another exemplary condition detector 650 for use in a super-pixel of the present disclosure, such as super-pixel 100 of FIG. 1A or the like. As shown in FIG. 6B, the condition detector 650 includes an amplifier 651 (–A1) connected to photosensitive element 601 (PD$_{CD}$). Amplifier 651 (–A1) may be a unity gain amplifier. In some embodiments, amplifier 651 (–A1) may be inverting. Capacitor 653 (C1) may be connected to amplifier 651 (–A1).

The condition detector 650 may further include amplifier 655 (–A2), capacitor 657 (C2), and a reset switch 659 connected in parallel to a common node with capacitor 653 (C1). Accordingly, whenever the condition detector 650 receives a control signal (e.g., an acknowledge signal from an external readout system), the reset switch 659 may close to short-circuit the detector and prepare for a new detection. Alternatively, condition detector 650 may be configured to reset automatically after outputting the set signal, as described below.

Amplifier 651 (–A1) (which may be an inverting amplifier) amplifies changes in the voltage from capacitor 653 (C1) such that these changes are deviations from a defined voltage level (that is, the level of voltage at capacitor 651 (C1) at a previous reset signal) at V$_{diff}$. In some embodiments, amplifier 651 may be controlled by transistor 661 such that amplifier 651 only amplifies in response to a control, such as a set signal from the logic circuit of the super-pixel. Whenever V$_{diff}$ crosses a threshold in a negative direction, a "– events" trigger signal is sent to the logic and AER handshake circuit, and the set signal is issued to the control logic of the super-pixel. Similarly, whenever V$_{diff}$ crosses a threshold (which may be the same threshold as above or a different threshold) in a positive direction, a "+ events" trigger signal is sent to the logic and AER handshake circuit, and the set signal is issued to the control logic of the super-pixel. Accordingly, the detector may detect increases in intensity above one threshold as well as decreases in intensity below the same or a different threshold.

Although described using the architecture of FIG. 6A or 6B, any suitable detector adapted to performing a comparison of a signal (e.g., voltage or current) proportional to the light impinging on photosensitive element (e.g., PD$_{CD}$) against one or more predefined conditions, such as one or more thresholds. Accordingly, any combination of transistors, capacitors, switches, and/or other circuit components arranged to perform such a comparison may be used in the image sensor of the present disclosure.

Figure 7:
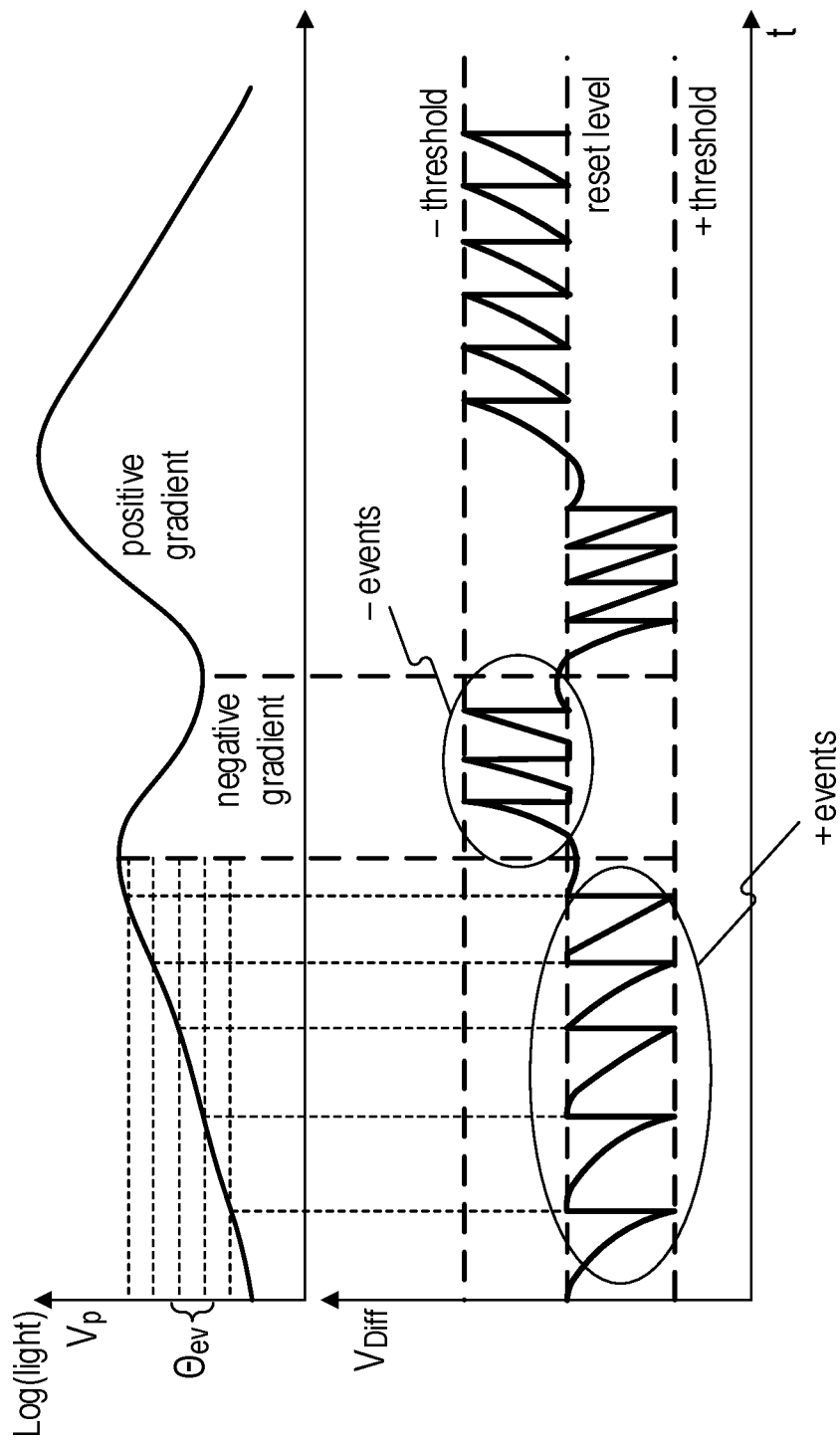
FIG. 7 is a graphical illustration of triggers generated by the detector of FIG. 6B, according to embodiments of the present disclosure.

FIG. 7 is a graphical illustration of triggers generated by the detector 650 of FIG. 6B. In FIG. 7, V$_p$ represents the voltage at capacitor 651 (C1) of the detector 650 and, thus, is a voltage proportional to the light impinging on photosensitive element 601 (PD$_{CD}$). Furthermore, V$_{diff}$ is a voltage signal of the detector 650 that is an inverted and amplified version of V$_p$ and, therefore, proportional to the output from photosensitive element 601 (PD$_{CD}$). As further depicted in FIG. 7, both increases in V$_p$ (depicted as "+ events") and decreases in V$_p$ (depicted as "– events") may cause the set signal to be generated. Because V$_{diff}$ is an inverted and amplified version of V$_p$, increases in V$_p$ appear as decreases in V$_{diff}$ and vice versa. In addition, FIG. 7 illustrates how a "+ threshold" may be set to the same (in magnitude) as the "– threshold" but may also be set to be different. Finally, FIG. 7 illustrates how V$_{diff}$ is reset to a baseline (depicted as "reset level") after each trigger (e.g., by closing reset switch 659).

Figure 8:
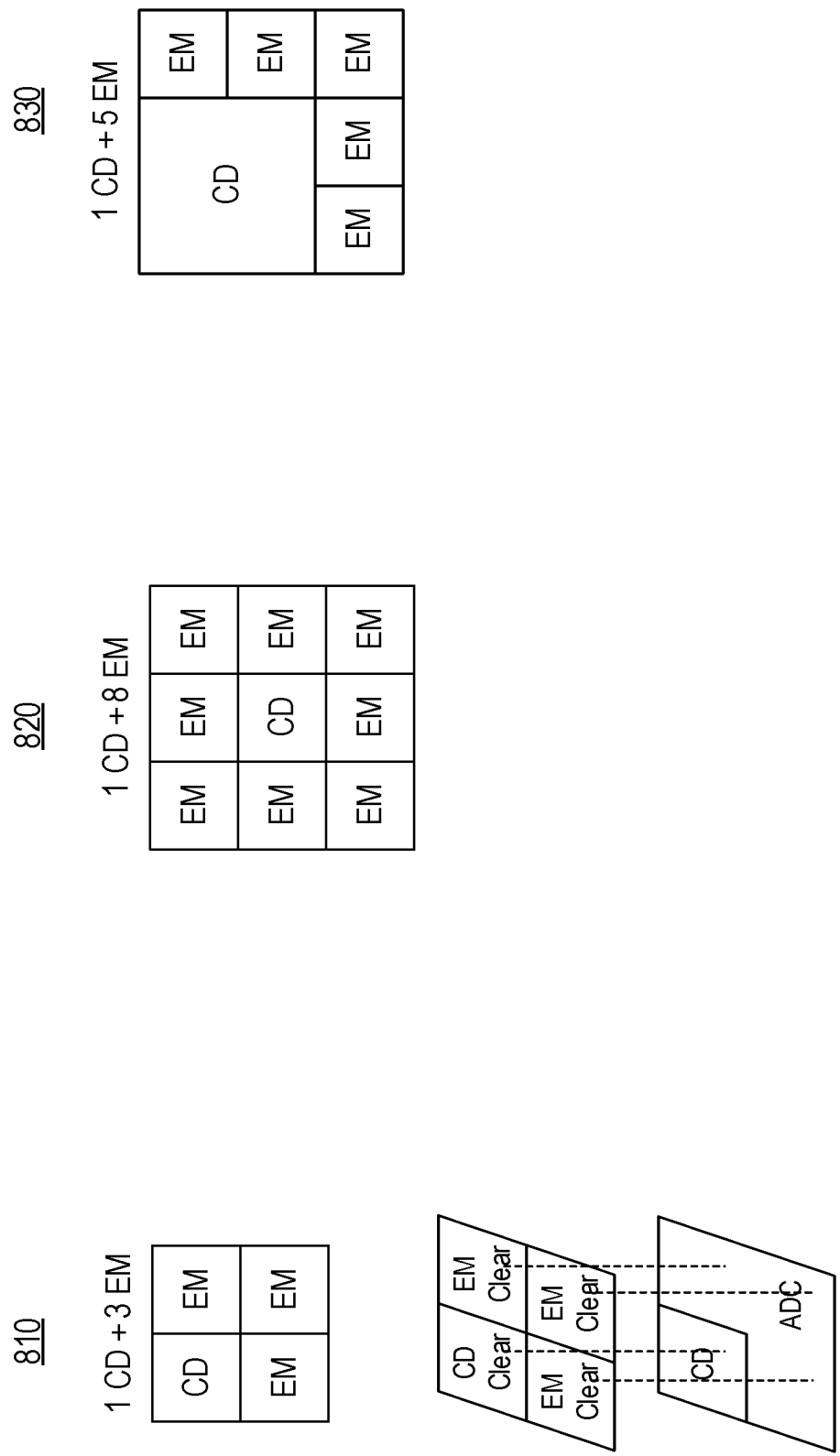
FIG. 8 is a schematic representation of different possible geometrical arrangements of the photodiodes of a condition detector and exposure measurement sub-circuits and a schematic representation of the connections from photodiodes to related circuits, according to embodiments of the present disclosure.

FIG. 8 is a schematic representation of different possible geometrical arrangements 810, 820, and 830 of the photodiodes of condition detector (e.g., CD 101) and exposure measurement sub-pixels (e.g., EM 107), and a schematic representation of the connections from photodiodes to related circuits (e.g., CD 105) and (e.g., 107). As shown in FIG. 8, a plurality of exposure measurement sub-pixels (EMs) (e.g., three EMs for super-pixel 810, eight EMs for super-pixel 820, five EMs for super-pixel 830, or the like) may be paired with a single condition detector (CD) in a super-pixel. Moreover, as shown in super-pixel 810 of FIG. 8, the plurality of EMs may all connect to the same analog-to-digital converter (ADC) in the super-pixel, resulting in sequential readouts of measurements from the EMs. Although depicted for super-pixel 810, the same connection scheme may be used for super-pixel 820 and super-pixel 830 depicted in FIG. 8. As explained above with respect to FIGS. 2B-2D, the EMs may integrate separately or overlapping and may integrate over the same time or over different times. Accordingly, various properties of the EMs in a single super-pixel may be varied, as explained below.

Figure 9:
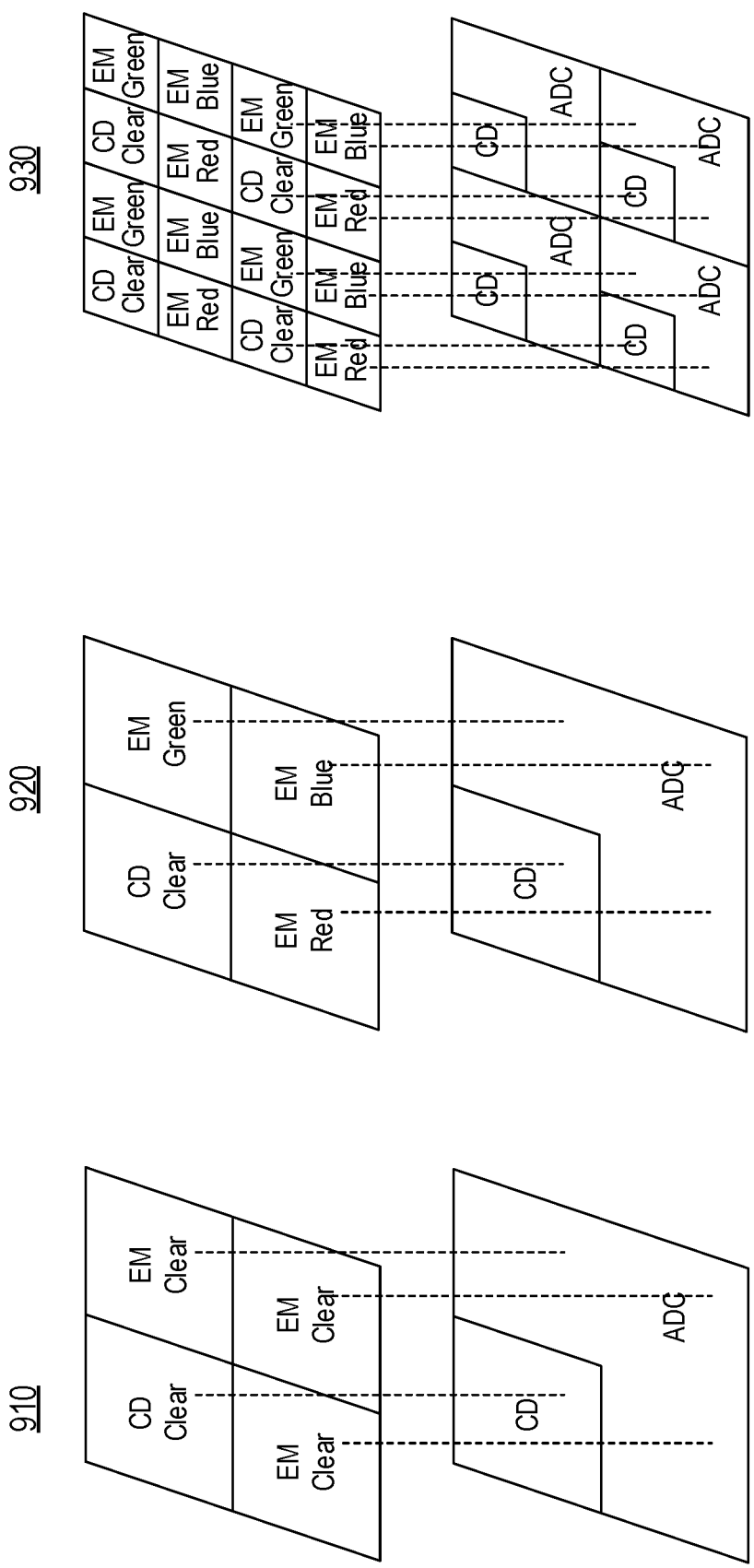
FIG. 9 is a schematic representation of exemplary super-pixels providing for high-dynamic range (HDR) imaging and/or red-green-blue (RGB) imaging, according to embodiments of the present disclosure.

FIG. 9 is a schematic representation of exemplary super-pixels providing for high-dynamic range (HDR) imaging and/or red-green-blue (RGB) imaging. As shown in FIG. 9, different ranges may be used for different EMs on a super-pixel (e.g., by varying integration time across the EMs, as shown in the example super-pixel 910 of FIG. 9). Alternatively, color filters may be applied to different EMs on a super-pixel to automatically result in colored digital data being read off the sensor. A combinatory example of color filters used with different ranges is shown as super-pixel 920 and super-pixel 930 of FIG. 9.

Moreover, although not shown in FIG. 9, but as explained above with respect to FIGS. 2B-2D, the conversion gains of the plurality of EMs in a super-pixel may also vary to increase the diversity of data extracted from a single super-pixel. The conversion gains may be varied in addition with the color filters or in lieu of the color filters.

Output from image sensors built with super-pixels of the present disclosure may provide for synchronous digital data based on asynchronous analog data rather than synchronous analog data like many extant image sensors. Moreover, the analog data may be converted to digital data at the pixel level of the image sensors of the present disclosure rather than at the chip level like many extant image sensors. Accordingly, the digital data may be used directly to construct differential images (e.g., optimal for use in encoding video) rather than requiring post-processing like extant image sensors. Moreover, the digital data output from the image sensors may be significantly reduced by reading out, at least clock cycle, only pixels that have met certain conditions rather than from all pixels.

In order to fabricate different portions of a pixel constructed in accordance with the present disclosure, the control detector, exposure measurement sub-pixel, and other photodiode-related circuits may require one particular voltage range while the other circuits, such as the control logic and the ADC, may require a different voltage range, e.g., in order to perform miniaturization and/or scalability of manufacturing. Accordingly, the supply voltage to the photodiode-related circuits may be different and higher than that supplied to the other circuits.

Accordingly, in some embodiments, different semiconductor technologies may be used to implement the photodiode-related circuits and the other circuits of the image sensor, respectively. For example, the two semiconductor processes (which may be based on different base technologies, have different minimum feature sizes, have different supply voltages, or the like) may be separately optimized for the two circuit types. The results of these processes may then be integrated using wafer-to-wafer stacking technology.

Figure 10A:
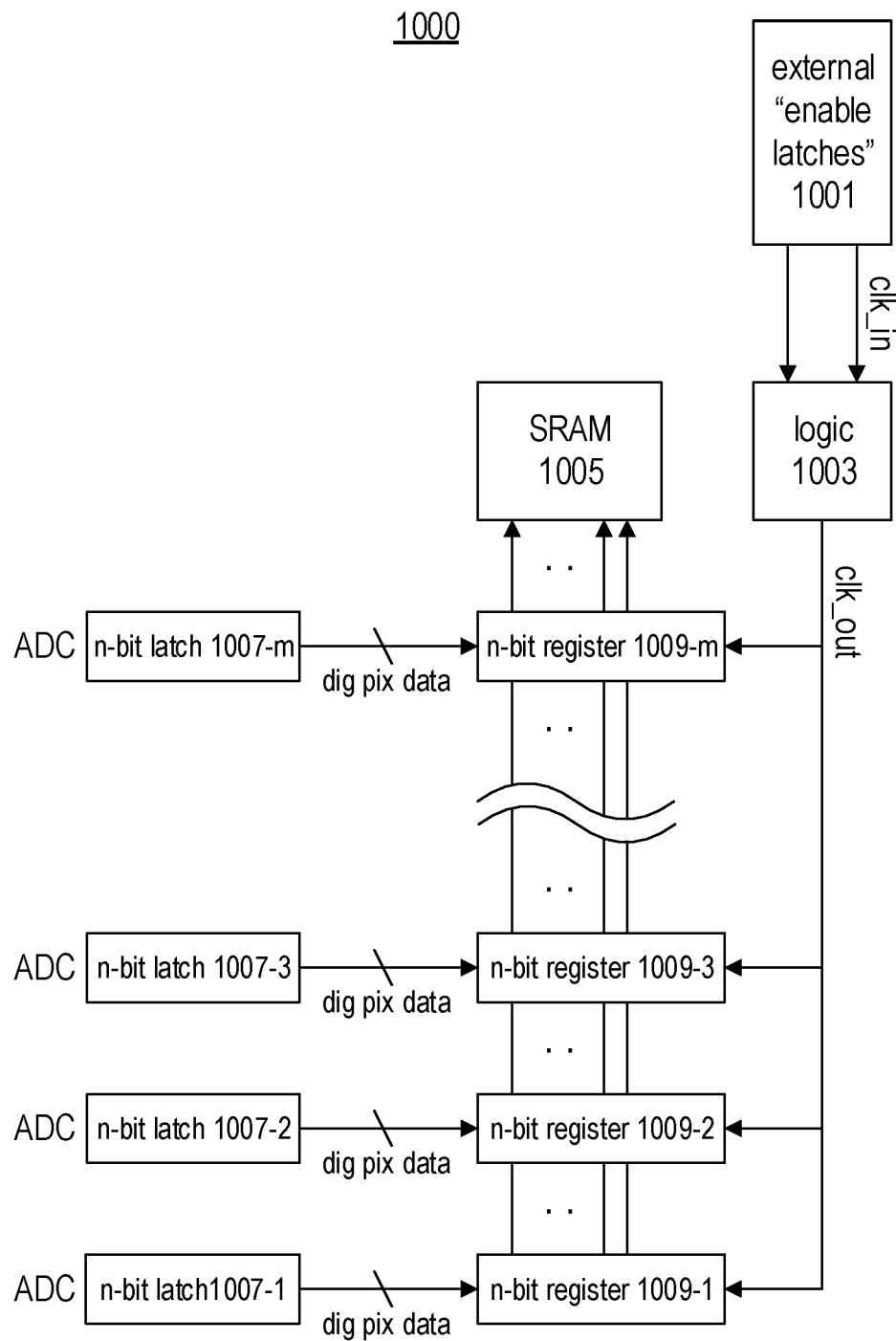
FIG. 10A is a schematic representation of a clocked readout circuit, according to embodiments of the present disclosure.

FIG. 10A shows an example readout system 1000, consistent with embodiments of the present disclosure. Readout system 1000 may be used with an array of super-pixels, such as any of the super pixels described herein (e.g., super-pixel 100 of FIG. 1A, super-pixel 100' of FIG. 1B, super-pixel 100" of FIG. 1C, or super-pixel 100''' of FIG. 1D). In the example of FIG. 10A, a plurality of external latches 1001 (e.g., similar to latch 115 described in FIG. 1D) may store indications of whether condition detectors of the various super-pixels were triggered before a current clock cycle. Readout system 1000 may further comprise a logic circuit 1003 for implementing the clocked readout and a memory array for storing digital values from the plurality of super-pixels, e.g., a static random access memory (SRAM) 1005. Although depicted as SRAM arrays, the memory array for storing digital values (as well as the enable latch array described here and with respect to FIG. 1D) may comprise any non-transitory memory, such as a dynamic random access memory (DRAM), a read-only memory (ROM), a hard disk drive, a flash memory, or the like. Readout system 1000 may comprise a shift register chain of a plurality of n-bit registers, e.g., register 1009-1, 1009-2, 1009-3, . . . , 1009-m, each receiving output from n-bit latches of ADCs of corresponding super-pixels, e.g., latches 1007-1, 1007-2, 1007-3, . . . 1007-m. Accordingly, in the example of FIG. 10A, there are m super-pixels sending output to m registers. However, in alternative embodiments, one or more ADCs may share one or more registers.

As shown in FIG. 10A, logic 1003 may, at each clock cycle, cause the n-bit registers, e.g., register 1009-1, 1009-2, 1009-3, . . . , 1009-m, to transfer contents stored therein to memory 1005. In some embodiments, registers 1009-1, 1009-2, 1009-3, . . . , 1009-m may first perform a correlated double sampling (CDS) operation, e.g., by subtracting a reset voltage output from the corresponding super-pixels from the digital signals output from the same. Furthermore, in the example of FIG. 10A, logic 1003 may skip a clock cycle if none of the registers 1009-1, 1009-2, 1009-3, . . . , 1009-m have any new information, e.g., as indicated by enable latches 1001.

Figure 10B:
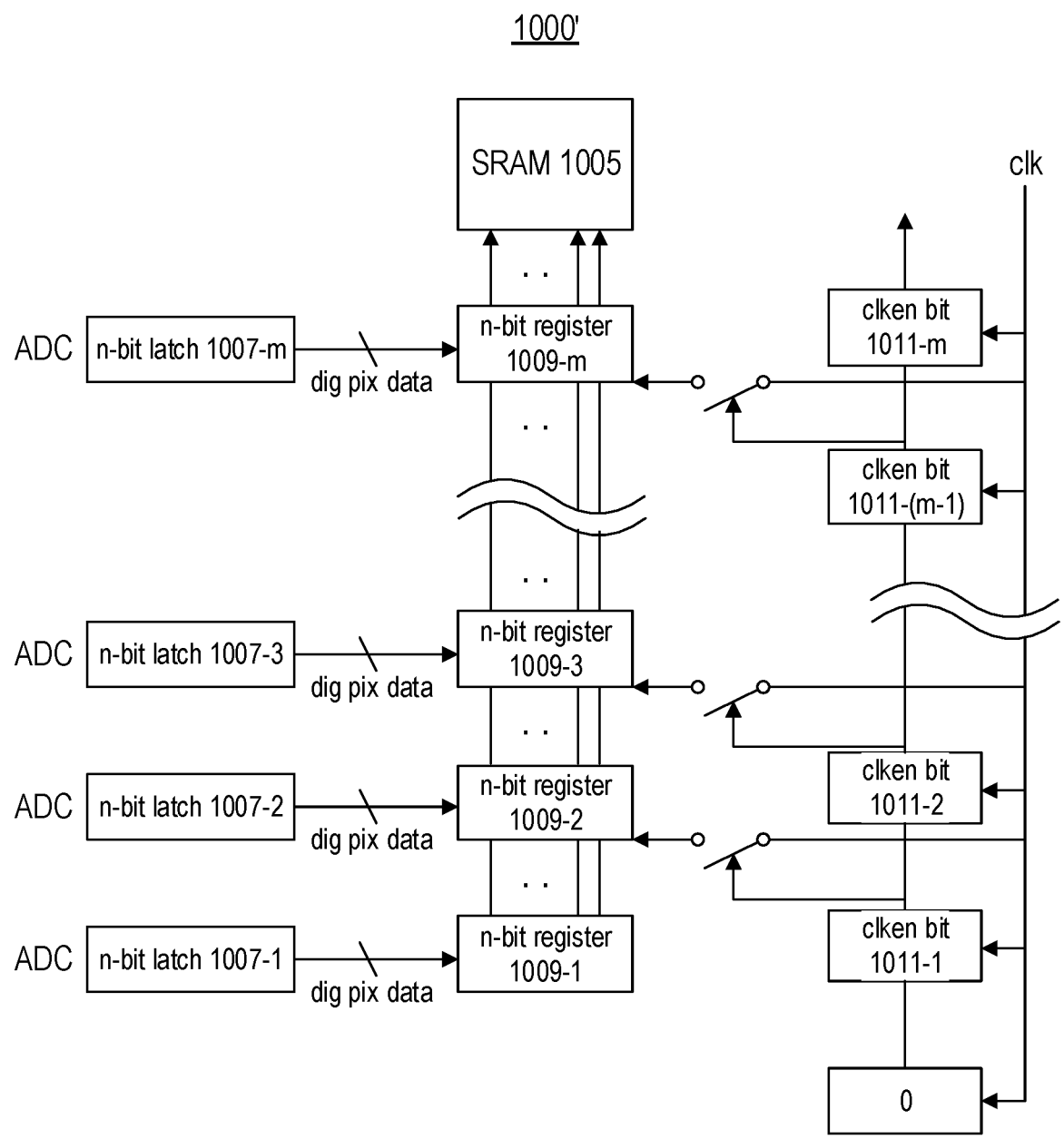
FIG. 10B is a schematic representation of a clocked readout circuit implemented with enable latches, according to embodiments of the present disclosure.

FIG. 10B depicts an example of another readout system 1000', consistent with embodiments of the present disclosure. System 1000' is similar to system 1000 of FIG. 10A but includes a plurality of bits 1011-1, 1011-2, . . . , 1009-(m−1), 1009-m. For example, each bit may comprise an enable latch for each corresponding super-pixel. Alternatively, each bit may copy a state (e.g., an ON state or OFF state or a storage of an analog signal from a condition detector) from latch 115 of each corresponding super-pixel. As depicted in FIG. 10B, the plurality of bits may activate a corresponding switch (or at least one transistor configured to act as a switch) upon receipt of a trigger signal from the corresponding super-pixel such that, during each clock cycle, only registers having corresponding bits that are activated are transferred to memory 1005.

Figure 11:
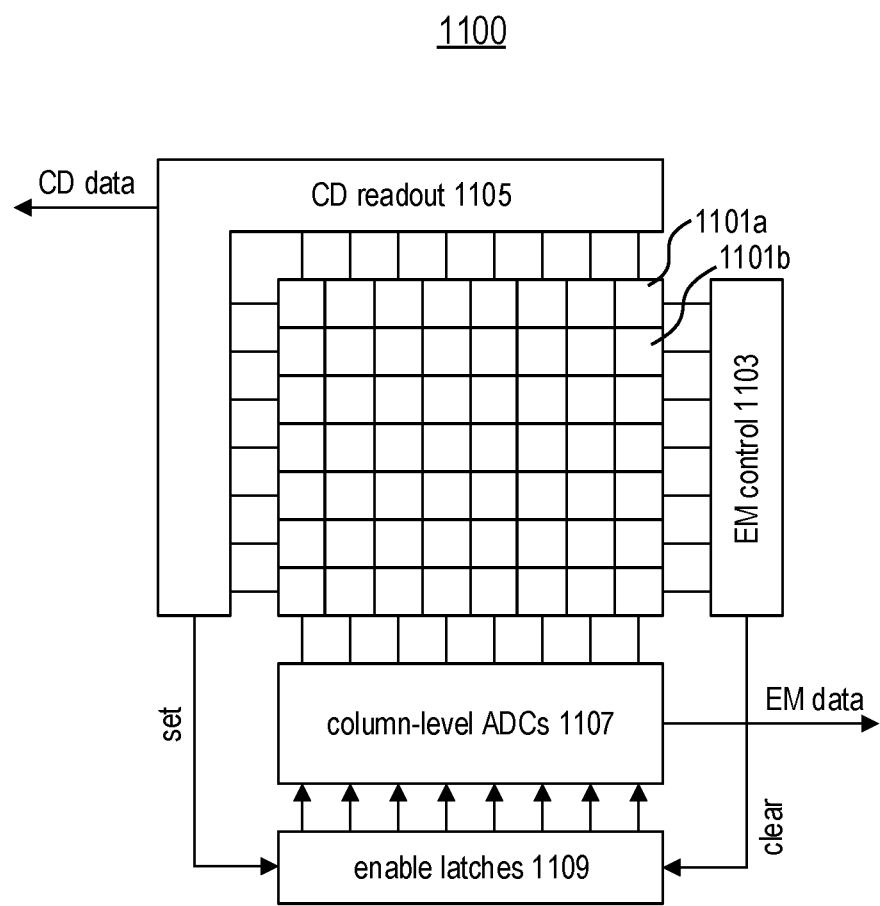
FIG. 11 is a schematic representation of an image sense using column-level analog-to-digital converters.

FIG. 11 depicts an exemplary image array 1100 implementing column-level ADCs 1107 rather than ADCs in each super-pixel (e.g., super-pixel 1101a, 1101b, etc.). In some embodiments, exposure measurement systems 270' of FIG. 2E, 290' of FIG. 2F, 250' of FIG. 2G, and/or 290" of FIG. H may be used in array 1100. Additionally or alternatively, ADCs 1107 may use system 350 of FIG. 3B.

As depicted in FIG. 11, condition detectors of the super-pixels (e.g., super-pixel 1101a, 1101b, etc.) may activate and communicate with condition detector readout 1105 to transfer corresponding trigger signals to enable latches 1109. Moreover, after exposure measurement circuits of the super-pixels (e.g., super-pixel 1101a, 1101b, etc.) perform integration and column-level ADCs 1107 covert corresponding integrated charges to digital signals based on enable latches 1109, exposure measurement control 1103 may deactivate the corresponding enable latches 1109 to prepare for another trigger signal.

FIG. 12 is a diagram of general temporal relations between arbitrary asynchronous detection events (CD) and related (triggered) exposure measurements (EM) in successive control cycles N, e.g., in the super-pixel of FIG. 1D. Each spike in "CD event" represents when condition detector 105 detects that the analog signal from photosensitive element 101 matches the condition, and each sloping portion of "EM meas." represents a conversion from an analog signal from one or more photosensitive elements of sub-pixels 107a, 107b, and 107c to a digital signal by ADC 109. As depicted in FIG. 12, by using a latch, e.g., latch 115 of FIG. 1D, a positive condition detection during conversion and output of a digital signal may result in another conversion and output in during the next clock cycle. For example, the second detection during the N+2 conversion cycle of FIG. 12 results in a second conversion at the next cycle in FIG. 12. Nonetheless, a positive condition detection while a previous condition detection awaits conversion will be ignored because the latch is already activated/enabled. For example, the second detection during the N+1 cycle of FIG. 12 will not result in a conversion cycle because the first detection already triggered a conversion cycle in the N+2 cycle.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

The invention claimed is:

1. An image sensor that includes a plurality of super-pixels, each super-pixel comprising:
a first photosensitive element;
a detector that is electrically connected to the first photosensitive element and configured to generate a trigger signal when an analog signal proportional to brightness of light impinging on the first photosensitive element matches a condition;
at least one second photosensitive element;
at least one exposure measurement sub-circuit that is electrically connected to the at least one second photosensitive element;
an analog-to-digital circuit configured to convert an analog signal proportional to brightness of light impinging on the at least one second photosensitive element to a digital signal,
wherein the analog-to-digital circuit does not convert the analog signal proportional to brightness of light impinging on the first photosensitive element to a digital signal; and
a logic circuit that is electrically connected to the detector and the analog-to-digital circuit and configurable to enable the analog-to-digital circuit in response to the trigger signal.

2. The image sensor of claim 1, wherein the logic circuit is further configured to disable the analog-to-digital circuit after the digital signal is read out from the analog-to-digital circuit.

3. The image sensor of claim 2, wherein the analog-to-digital circuit is configured to output the digital signal to an external readout system.

4. The image sensor of claim 2, wherein the analog-to-digital circuit is further configured to send a signal to reset the logic circuit after completing the conversion of the analog signal to the digital signal.

5. The image sensor of claim 1, wherein the logic circuit is further configured to enable the analog-to-digital circuit in response to an external control signal.

6. The image sensor of claim 1, wherein the detector is further configured to output the trigger signal to an external readout system.

7. The image sensor of claim 6, wherein the external readout system is configured to send an acknowledgment signal to the detector in response to the trigger signal, and the detector is further configured to reset in response to the acknowledgment signal.

8. The image sensor of claim 1, wherein the logic circuit comprises at least one of:
a control logic that is electrically connected to the detector and a switch that is controlled by the control logic; and
a control logic that is electrically connected to the detector and a logic gate that is connected to the control logic and to an external controller.

9. The image sensor of claim 1, wherein an external readout system requests output from the analog-to-digital circuit in accordance with a circuit clock, and the analog-to-digital circuit is configured to output the digital signal in response to the request.

10. The image sensor of claim 1, further comprising:
a plurality of second photosensitive elements; and
a plurality of exposure measurement sub-circuits, wherein each exposure measurement sub-circuit comprises at least one of the plurality of second photosensitive elements.

11. The image sensor of claim 10, wherein the plurality of second photosensitive elements output respective analog signals to separate capacitor nodes of respective exposure measurement sub-circuits.

12. The image sensor of claim 11, wherein at least two of the plurality of exposure measurement sub-circuits have different gains.

13. The image sensor of claim 11, wherein the plurality of second photosensitive elements are configured to output the respective analog signals to the separate capacitor nodes at different times.

14. The image sensor of claim 10, wherein the plurality of second photosensitive elements are configured to output respective analog signals to a capacitor node shared by the plurality of exposure measurement sub-circuits.

15. The image sensor of claim 10, wherein at least two of the plurality of second photosensitive elements include at least one of:
different density filters, and
different color filters.

16. The image sensor of claim 10, wherein a comparator that comprises a first transistor of the analog-to-digital circuit is coupled with at least one transistor associated with each of the plurality of exposure measurement sub-circuits.

17. The image sensor of claim 16, further comprising at least one reset transistor associated with each of the plurality of exposure measurement sub-circuits.

18. The image sensor of claim 17, wherein the at least one exposure measurement sub-circuit is further configured to output a reset voltage of each reset transistor before outputting the analog signal proportional to brightness of light impinging on the respective at least one second photosensitive element.

19. The image sensor of claim 18, wherein the at least one exposure measurement sub-circuit outputs the reset voltage of each reset transistor sequentially.

20. The image sensor of claim 19, wherein the reset voltage is output to a circuit configured to perform a correlated double sampling (CDS) correction for noise and mismatch.

21. A super-pixel for use in an image sensor, the super-pixel comprising:
   a first photosensitive element;
   a detector that is electrically connected to the first photosensitive element and configured to generate a trigger signal when an analog signal proportional to brightness of light impinging on the first photosensitive matches a condition;
   at least one second photosensitive element;
   at least one exposure measurement sub-circuit that is electrically connected to the at least one second photosensitive element;
an analog-to-digital circuit configured to convert an analog signal proportional to brightness of light impinging on the at least one second photosensitive element to a digital signal,
   wherein the analog-to-digital circuit does not convert the analog signal proportional to brightness of light impinging on the first photosensitive element to a digital signal; and
   a logic circuit that is electrically connected to the detector and the analog-to-digital circuit and configured to enable the analog-to-digital circuit in response to the trigger signal and to disable the analog-to-digital circuit after the digital signal is read out from the analog-to-digital circuit.

22. The super-pixel of claim 21, wherein the logic circuit comprises at least one of:
   a control logic that is electrically connected to the detector and a switch that is controlled by the control logic; and
   a control logic that is electrically connected to the detector and a logic gate that is connected to the control logic and to an external controller.

23. A method for controlling an image sensor having a plurality of super-pixels, comprising:
   receiving a first analog signal proportional to light impinging on a first photosensitive element of a super-pixel of the plurality of super-pixels;
   generating a trigger signal when the first analog signal matches a condition using a detector;
   in response to the trigger signal, enabling an analog-to-digital circuit;
   receiving at least one second analog signal proportional to light impinging on at least one second photosensitive element of the super-pixel;
   using the analog-to-digital circuit, converting the at least one second analog signal to a digital signal; and
   wherein the analog-to-digital circuit does not convert the first analog signal to a digital signal.

24. The method of claim 23, further comprising:
   disabling the analog-to-digital circuit after the conversion of the at least one second analog signal to the digital signal; and
   outputting the digital signal to an external readout system.

25. The method of claim 23, further comprising outputting, using the analog-to-digital circuit, the digital signal to the external readout system.

26. The method of any one of claim 23, further comprising sending, using the analog-to-digital circuit, a signal to reset the logic circuit after completing the conversion of the analog signal to the digital signal.

27. The method of claim 23, further comprising:
   outputting, using the detector, the trigger signal to an external event system; and
   receiving, using the detector, an acknowledgement signal from the external event system in response to the trigger signal, and resetting the detector response to the acknowledgement signal.

28. The method of any one of claim 23, further comprising receiving a request for the analog-to-digital circuit, from an external readout system, output in accordance with a circuit clock, and outputting the digital signal in response to the request.

* * * * *

UNITED STATES PATENT AND TRADEMARK OFFICE
CERTIFICATE OF CORRECTION

| | |
|---|---|
| PATENT NO. | : 11,368,645 B2 |
| APPLICATION NO. | : 17/255972 |
| DATED | : June 21, 2022 |
| INVENTOR(S) | : Thomas Finateu et al. |

It is certified that error appears in the above-identified patent and that said Letters Patent is hereby corrected as shown below:

In the Claims

In Claim 21, Column 31, Line 11, "on the first photosensitive matches" should read --on the first photosensitive element matches--.

In Claim 26, Column 32, Line 22, "The method of any one of claim 23," should read --The method of claim 23,--.

In Claim 28, Column 32, Line 33, "The method of any one of claim 23," should read --The method of claim 23,--.

Signed and Sealed this
Thirteenth Day of December, 2022

Katherine Kelly Vidal
*Director of the United States Patent and Trademark Office*